US012619360B2

(12) United States Patent
Wahl et al.

(10) Patent No.: US 12,619,360 B2
(45) Date of Patent: May 5, 2026

(54) TECHNIQUES FOR ADAPTIVE COALESCING OF LOGGING OPERATIONS

(71) Applicant: Dell Products L.P., Hopkinton, MA (US)

(72) Inventors: Michael P. Wahl, Bulverde, TX (US); Vamsi K. Vankamamidi, Hopkinton, MA (US); James Vega McCoy, Holliston, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/918,586

(22) Filed: Oct. 17, 2024

(65) Prior Publication Data

US 2026/0111116 A1     Apr. 23, 2026

(51) Int. Cl.
*G06F 3/06* (2006.01)

(52) U.S. Cl.
CPC .......... *G06F 3/0613* (2013.01); *G06F 3/0629* (2013.01); *G06F 3/0673* (2013.01)

(58) Field of Classification Search
None
See application file for complete search history.

(56) References Cited

U.S. PATENT DOCUMENTS

2018/0018101 A1* 1/2018 Benisty ................. G06F 3/0659
2019/0324669 A1* 10/2019 Widder ............... G06F 12/0246

2020/0272360 A1* 8/2020 Li ........................... G06F 3/064
2022/0012132 A1* 1/2022 Wang .................. G06F 11/1471
2022/0413756 A1* 12/2022 Chandramani ......... G06F 3/061
2023/0106982 A1* 4/2023 David .................. G06F 3/0637
                                                    707/704
2024/0020031 A1* 1/2024 Kronrod .............. G06F 3/0664
2024/0020225 A1* 1/2024 Shveidel .............. G06F 3/0608

OTHER PUBLICATIONS

U.S. Appl. No. 18/598,336, filed Mar. 7, 2024, Processing Write Operation Information Using Inflated Data, Amihay Azruel, et al.
U.S. Appl. No. 17/865,713, filed Jul. 15, 2022, Coalescing Logged Operations, Svetlana Kronrod, et al.

* cited by examiner

*Primary Examiner* — Kaushikkumar M Patel
(74) *Attorney, Agent, or Firm* — BainwoodHuang

(57)     ABSTRACT

Techniques can include: receiving host write I/Os; and performing processing that persistently records the host write I/Os on a log device including a metadata log for storing metadata portions for the host write I/Os. The processing can include: aggregating, in a write aggregation queue, log write requests that write metadata portions for the host write I/Os in a segment of metadata log entries of the metadata log of the log device; and responsive to determining that i) the log write requests corresponding to the segment write an amount of metadata equal to a maximum size, or ii) a maximum amount of time has elapsed during said aggregating, sending an aggregated write request to the metadata log of the log device, wherein the aggregated write request writes the metadata portions to the segment of metadata log entries. The maximum size can denote an integrated unit size of the log device.

20 Claims, 10 Drawing Sheets

TECHNIQUES FOR ADAPTIVE
COALESCING OF LOGGING OPERATIONS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving first host write I/Os; and performing first processing that persistently records the first host write I/Os on a log device, wherein the log device includes a metadata log for storing metadata portions for the first host write I/Os, wherein the first processing includes: aggregating, in a first write aggregation queue, first log write requests that write first metadata portions for the first host write I/Os in a first segment of first metadata log entries of the metadata log of the log device; and responsive to determining that i) the first log write requests corresponding to the first segment write a first amount of metadata equal to a maximum size, or ii) a maximum amount of time has elapsed during said aggregating, sending a first aggregated write request to the metadata log of the log device, wherein the first aggregated write request writes the first metadata portions to the first segment of first metadata log entries.

In at least one embodiment, the maximum size can denote a multiple of an indirection unit (IU) size of the log device, where the IU size can denote the internal block size of the log device. Each write to the log device, that writes an amount of content having a corresponding size that is less than the IU size, results in the log device internally performing a read modify write (RMW) operation to write the content. Each of the first log write requests can write one of the first metadata portions, and wherein each of the first metadata portions can have a corresponding size that is less than the IU size. The first log writes corresponding to the first segment can collectively write the first amount of metadata equal to the IU size of the log device. Each of the first metadata portions can be associated with a corresponding one of the first host write I/Os that writes first content to a first target location, and wherein said each metadata portion can include first information describing the first target location.

In at least one embodiment, a first host write I/O operation can be included in the first host write I/O operations, wherein the first host write I/O operation can be from a first host and can write first content to a first target location. The first processing can include persistently recording the first content on the log device; and the method can include, responsive to persistently recording the first content and completing the first aggregated write request that writes the first metadata portions to the first segment of first metadata log entries, returning an acknowledgement to the first host regarding completion of the first host write I/O operation.

In at least one embodiment, the first processing can be performed during a time period N when aggregation of log of log write requests that write metadata portions for corresponding host write I/Os to the metadata log of the log device is enabled thereby resulting in said aggregating and said sending the first aggregated write request. Processing can include: determining, for the time period N, a host write I/O rate and a bandwidth regarding data written to the log device; and responsive to determining, for the time period N, that i) the host write I/O rate exceeds a first threshold or ii) the bandwidth exceeds a second threshold, enabling, for a next time period N+1, aggregation of log write requests that write metadata portions for corresponding host write I/Os to the metadata log of the log device. Responsive to determining, for the time period N, that i) the host write I/O rate does not exceed the first threshold and ii) the bandwidth does not exceed the second threshold, aggregation of log write requests, that write metadata portions for corresponding host write I/Os to the metadata log of the log device, can be disabled for the next time period N+1.

In at least one embodiment, the first processing can include: aggregating, in a first allocation aggregation queue, first log allocation requests each requesting allocation of a metadata log entry from the metadata log of the log device for storing one of the first metadata portions for a corresponding one of the first host write I/Os; and responsive to determining that i) the first log allocation requests write the first amount of metadata equal to the maximum size, or ii) the maximum amount of time has elapsed during said aggregating of the first log allocation requests, sending a first aggregated allocation request to the metadata log of the log device, wherein the first aggregated log request requests allocation of the first segment of the first metadata log entries from the metadata log stored on the log device. The first metadata log entries of the first segment can be contiguous consecutive metadata log entries of the metadata log. The method can be performed in a system with a plurality of processing nodes, and wherein each of the plurality of processing nodes is associated with i) a corresponding one of a plurality of write aggregation queues used to aggregate log write requests for metadata portions written to segments by said each processing node, and ii) a corresponding one of a plurality of allocation aggregation queues used to aggregate log allocation requests for metadata log entries requested by said each processing node.

In at least one embodiment, the plurality of write aggregation queues can include the first write aggregation queue, and wherein the plurality of allocation aggregation queues can include the first allocation aggregation queue. The plurality of processing nodes can include a first processing node. The first write aggregation queue can be associated with the first processing node whereby the first write aggregation queue aggregates log write requests for data portions written to segments by the first processing node. The first allocation aggregation queue can be associated with the first processing node whereby the first allocation aggregation queue can aggregate log allocation requests for metadata log entries requested by the first processing node.

In at least one embodiment, the plurality of processing nodes can include a first processing node and a second processing node. The first write aggregation queue can be associated with the first processing node whereby the first write aggregation queue can aggregate log write requests for data portions written to segments by the first processing node. The first allocation aggregation queue can be associated with the second processing node whereby the first allocation aggregation queue can aggregates log allocation requests for metadata log entries requested by the second processing node.

In at least one embodiment, processing can include receiving, by an arbiter, a plurality of aggregated allocation requests requesting allocation of segments of metadata log entries from the metadata log stored on the log device, wherein the plurality of aggregated allocation requests includes the first aggregated allocation request requesting allocation of the first segment of metadata log entries, wherein the first segment has a first size, and wherein the plurality of aggregated allocation requests includes a second aggregated allocation request requesting allocation of a second segment of metadata log entries, wherein the second segment has a second size, wherein the first size is larger than the second size thereby denoting that the first segment has a greater number of metadata log entries than the second segment. The first aggregated allocation request and the second aggregated allocation request can be from the first processing node. The aggregated allocation request can have a corresponding first time stamp denoting an earliest time at which a log allocation request, that is aggregated into the first aggregated allocation request, was enqueued in the first allocation aggregation queue. The second aggregated allocation request can have a corresponding second time stamp denoting an earliest time at which a log allocation request, that is aggregated into the second aggregated allocation request, was enqueued in the first allocation aggregation queue. The first time stamp can denote an earlier point in time prior to the second time stamp, and processing can include: the arbiter determining, based on the first time stamp and the second time stamp, to service the first aggregated allocation request prior to the second aggregated allocation request thereby resulting in allocation of the first segment prior to the second segment.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
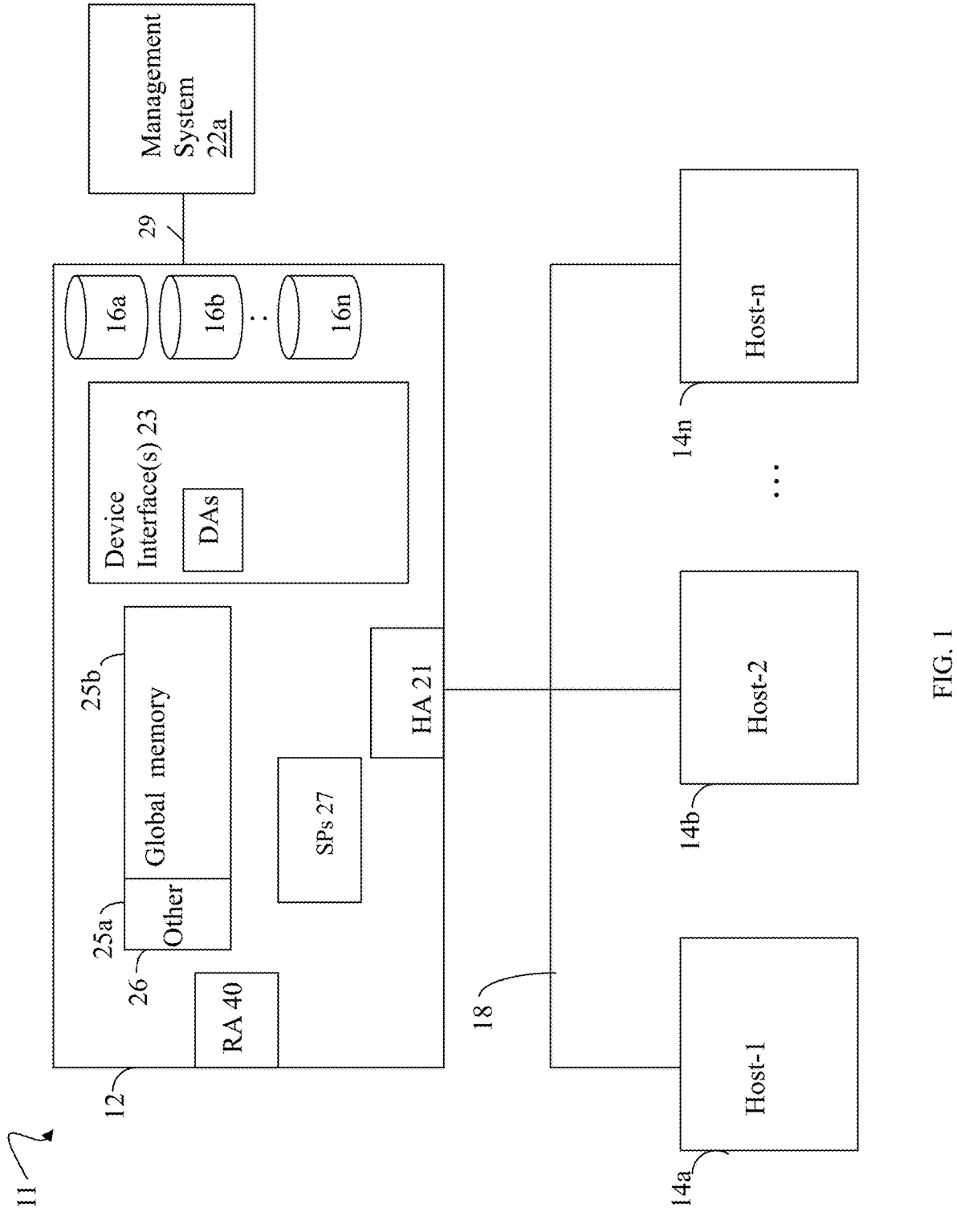
FIG. 1 is an example of components that can be included in a system in accordance with the techniques of the present disclosure.

A system, such as a data storage system, can receive write I/Os from storage clients, such as external hosts. A write I/O can be a request to write content or data to a target location, such as a target logical address. To achieve lower I/O response times, the storage system can persistently record each write I/O in a log (sometimes referred to as a user data (UD) log), and then return a response acknowledging completion of the write I/O. Recording the write I/O in the log can include persistently recording i) the data or content written along with ii) corresponding metadata (MD) for the write I/O. At some time later, the recorded write I/O can be flushed from the log, such as by background processing, to store the corresponding written content or data on back-end (BE) non-volatile storage associated with the target location. The storage system can persistently record the write I/O in the log prior to acknowledging the write I/O to the host to prevent data loss, for example, in case of a high-availability (HA) event or power-outage.

The MD of the write I/O recorded in the log can generally include information describing the write I/O such as, for example, the target location, such as the target logical address. The target logical address can identify, for example, a target device and location on the target device. The target device can be, for example, a logical device, and the location on the target device can be, for example, a logical block address (LBA) or offset denoting a particular location on the target device. In at least one embodiment, the write I/O MD stored in the log can also be referred to as a descriptor for the recorded write I/O that writes corresponding content or data also stored in the log. The log can be persistently stored on a persistent or non-volatile storage device sometimes also referred to as the log device. Thus for each write I/O, the log, and log device, can be used to persistently record both the write data and the corresponding descriptor or metadata of the write I/O.

One choice for a log device can be an NVRAM (nonvolatile random access memory) device, such as an NVMc® (Nonvolatile Memory Express) PCIe® (Peripheral Component Interconnect Express) block device. The NVRAM device can be characterized as a high performance and high endurance storage device that can be used for persistently storing the log. However, use of such an NVRAM device can have a limited lifetime and may require using new types of storage devices from different vendors such as every few years.

Rather than use NVRAM devices for storing the log, it can be desirable to use other forms of persistent storage devices, such as solid state storage devices (SSDs), for log devices. As noted above, recording a write I/O in the log can include storing the related metadata or a descriptor for the write I/O. The size of this metadata or descriptor for the write I/O can be less than the size of the IU (indirection unit) of the SSD. The IU can denote the native internal block size of the SSD. The SSD normally handles a small write, such as the write I/O metadata or descriptor, having a corresponding size that is less than the IU size by performing an internal read-modify-write (RMW) operation. For the RMW operation, the SSD can read existing content of a stored block (e.g., of the IU size), determine modified content of the block such as by performing a logical OR operation of the existing content of the block with the new data or content written, and then writing out the modified content to the block. Thus a small write to the SSD, where the small write has an associated data payload that is less than the SSD's IU size, results in using internal capabilities of the SSD in performing the foregoing RMW operation to store content internally in the SSD in IU size blocks. In contrast, performing a write to the SSD that is a multiple of the SSD's IU size can be done without having the SSD perform the internal RMW operation. The maximum IOPS (I/Os per second) that the SSD can sustain for writes whose size is less than its IU is often much less than the maximum sustained IOPS for IU-sized writes. NVRAM devices, unlike SSD devices, do not have this same small write performance penalty when storing host write I/O metadata due to the typically smaller IU size of the NVRAM device. For example, the native or internal block size (e.g., IU) of the NVRAM device is typically smaller than the SSD's IU size so that the host write I/O metadata can be a multiple of the NVRAM device's smaller IU. For example, the size of the metadata for a host write I/O can be 512 bytes and the IU of the NVRAM device can be 512 bytes. In contrast, although the SSD can allow writes of 512 bytes, the IU size of an SSD can be, for example, 4 KB whereby the 512 byte write to the SSD triggers the SSD internal RMW operation to store the 512 bytes written into a 4 KB block on the SSD. Thus an NVRAM device can avoid the foregoing small write performance penalty incurred with the SSD, where the SSD typically has a relatively larger IU size than the NVRAM device.

Accordingly, the techniques of the present disclosure can be utilized in at least one embodiment by coalescing metadata or descriptors for recorded host write I/Os of the log in efforts to maximize host IOPS and bandwidth that can be achieved using an SSD as the log device. It should be noted that although the techniques of the present disclosure can be described with respect to use of an SSD, more generally the techniques of the present disclosure can be used with any suitable non-volatile or persistent storage device used as the log device generally having a larger IU size than the size of record of host write I/O metadata stored in the log device, where multiple instances of host write I/O metadata for corresponding multiple host write I/Os can be coalesced and stored in a single IU unit of storage of the log device.

In at least one embodiment, the log used to record write I/Os can include a first log for storing data or content written and a second log for storing the write I/O metadata or descriptors. The second log can sometimes also be referred to as a metadata log, a descriptor log, or a page descriptor (PDESC) log. Both the first log and the second log can be stored persistently on the log device, where the log device can be an SSD with an IU size. The size or amount of metadata stored in the second log for each recorded host write I/O can be smaller than the SSD's IU size. In at least one embodiment, M portions of metadata for M corresponding host write I/Os recorded in the log can have a corresponding size equal to the IU size of the SSD. Put another way in at least one embodiment, M metadata portions or descriptors can be stored in a single SSD storage block of the IU size. In at least one embodiment, M metadata portions can be written in a single write to the log device where the single write has a corresponding data payload equal to the SSD's IU size. In at least one embodiment, the techniques of the present disclosure provide for coalescing the write I/O metadata or descriptors persistently stored in the metadata log or descriptor log. Coalescing can include collecting a set of metadata log write I/O requests, that write descriptors of storage client write I/Os, and aggregating them into a single write request to the metadata log stored on the log device. In at least one embodiment where the log device storing the metadata log is an SSD with an IU size, the requests to write the descriptors to the metadata log can be aggregated such that the aggregated write of such descriptors is a single write to the metadata log, where the single write is the IU size, or more generally, a multiple of the IU size of the log device. Additionally in at least one embodiment, to accommodate for host or storage client workload periods having a low write I/O workload or other delays in processing storage client write I/Os, a maximum amount of wait time, MAX, can be specified. MAX can denote the maximum amount of time to wait collecting or aggregating metadata log I/O write requests of descriptors into the single write that is an IU size multiple. If the maximum wait time is reached prior to collecting or accumulating a single aggregated write that is an IU size multiple, the metadata log I/O write requests of descriptors collected within the maximum wait time can be written out to the metadata or descriptor log even though the size of the single aggregated write is not a multiple of the log device's IU size. In at least one embodiment for a host write I/O, once the host write I/O write data and an aggregated write including the host write I/O's descriptor have been persistently stored or written to the log device, an acknowledgement can be returned to the host that issued the host write I/O.

In at least one embodiment, the techniques of the present disclosure provide for minimizing host I/O latency when the current host IOPS and bandwidth requirements are below corresponding thresholds based, at least in part, on the maximum limits or capabilities of the log device. Generally, coalescing can increase the maximum host IOPS processed where the SSD's IOPS limit for small writes (e.g., writes less than an IU amount of data) is a performance bottleneck. However, coalescing can extend I/O latency as coalescing can incur additional latency while waiting for descriptors to aggregate such as prior to writing out such descriptors to the log device in a single write that is the size of the IU, or more generally a multiple thereof.

Accordingly in at least one embodiment, the techniques of the present disclosure provide for adaptive coalescing to preserve low latency for low host write I/O rates while also improving maximum IOPS performance with minimal latency impact for high host write I/O rates. In at least one embodiment, the techniques of the present disclosure provide for monitoring, on a periodic basis, i) the number of host write I/Os or host write IOPS rate and ii) the average size of such writes I/O received during period N to determine, for period N+1, whether to perform aggregation of the host write I/O metadata or descriptors stored on the log device. In at least one embodiment, if either i) the foregoing host write IOPS rate for the average size of write I/Os for period N exceeds a corresponding write IOPS threshold, or ii) a bandwidth or data rate of content written to the log device exceeds a corresponding bandwidth threshold, processing can be performed to aggregate and coalesce host write I/O descriptors for period N+1. In at least one embodiment, if both of the foregoing write IOPS and bandwidth thresholds for time period N are not exceeded, such aggregation and coalescing of host write I/O metadata or descriptors can cease, disengage or be disabled for time period N+1 to thereby decrease the I/O latency experienced in connection with host I/Os. In at least one embodiment, the foregoing thresholds can be based, at least in part, on the maximum limits or capabilities of the log device.

In at least one embodiment, the techniques of the present disclosure can be used in a dual node, or more generally a multi-node, storage system, where each node can receive host or storage client write I/Os for processing. In at least one embodiment, the multiple nodes i) can share a single log device, and ii) can share a single metadata or descriptor log stored on the log device. Each node can have its own aggregation queue to aggregate descriptor allocation requests for space allocation of the descriptor or metadata log. Thus in at least one embodiment, processing can collect or aggregate descriptor or metadata log space allocation requests of a node in the node's own private descriptor allocation aggregation queue that can be used only by the respective node for collecting or accumulating requests. In at least one embodiment, descriptor allocation requests can also be collected or aggregated until the earliest of the following occurs i) a maximum size of the aggregated descriptor allocation requests is reached, or ii) a maximum delay time or wait time is reached. In at least one embodiment if either of the foregoing occurs, a descriptor or metadata log space allocation can be performed based on the total size of the aggregated descriptor allocation requests. The foregoing maximum size in at least one embodiment can be the IU size of the SSD used as the log device. More generally in at least one embodiment, the foregoing maximum size can be a multiple of the log device's IU size. The total size of the aggregated requests can be equal to the maximum size. If the maximum wait time is reached prior to the aggregated allocation requests reaching the maximum size, then the total size of the aggregated requests can be less than the maximum size.

The techniques of the present disclosure can further provide for coordinating metadata or descriptor log space allocations among the multiple nodes based, at least in part, on a sequential time order of associated descriptor allocation requests.

Thus in at least one embodiment, coalescing and aggregation can be performed for space allocation from the descriptor or metadata log as well as for writing to the descriptor or metadata log.

The foregoing and other aspects of the techniques of the present disclosure are described in more detail in the following paragraphs.

Referring to the FIG. 1, shown is an example of an embodiment of a system 11 that can be used in connection with performing the techniques described herein. The system 11 includes a data storage system 12 connected to the host systems (also sometimes referred to as hosts) 14a-14n through the communication medium 18. In this embodiment of the system 11, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 11.

Each of the host systems 14a-14n and the data storage system 12 included in the system 11 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 11 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14*a-n*. The data storage array can include one or more RAs used, for example, to facilitate communications between data storage arrays. The data storage array can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage array. In one embodiment, the device interfaces 23 can perform data operations using a system cache included in the global memory 25*b*, for example, when communicating with other device interfaces and other components of the data storage array. The other portion 25*a* is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* through the channels. The host systems 14*a-n* do not address the drives or devices 16*a*-16*n* of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that can be used to manage and monitor the data storage system 12. In one embodiment, the management system 22*a* can be a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
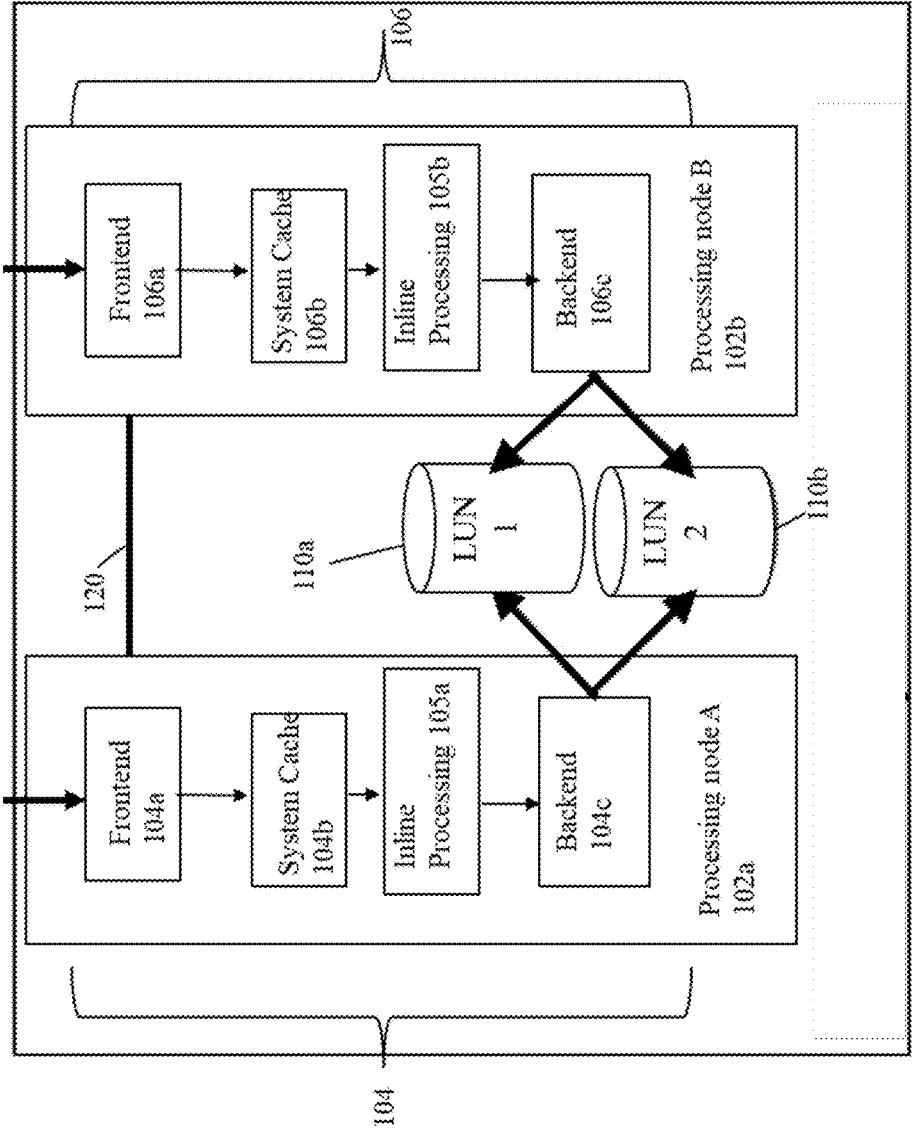
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment as discussed in more detail elsewhere where herein, the log can also be used to log or record other operations such as operations to create and delete snapshots of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
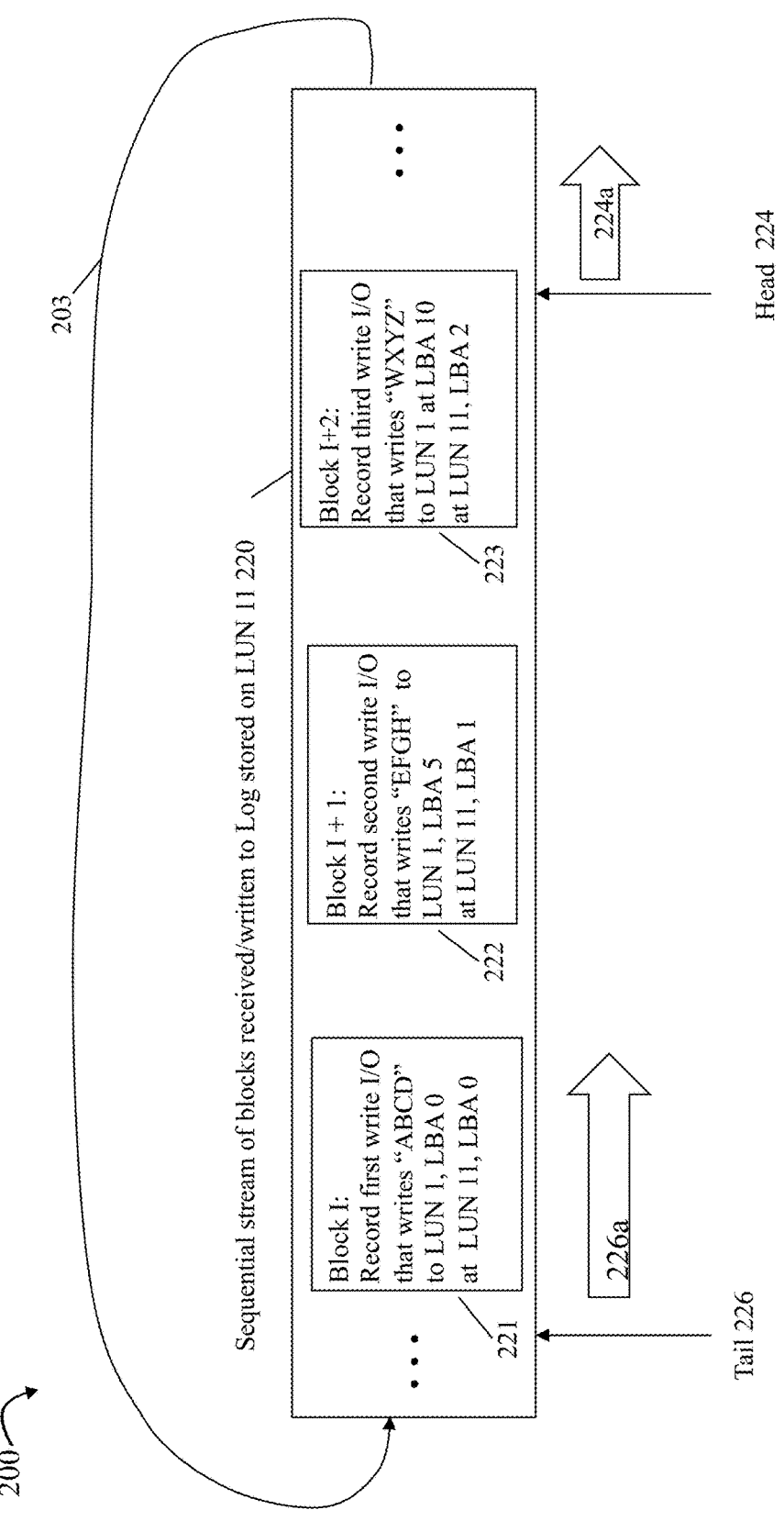
FIGS. 2B, 2C and 2D are examples illustrating use of a log in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
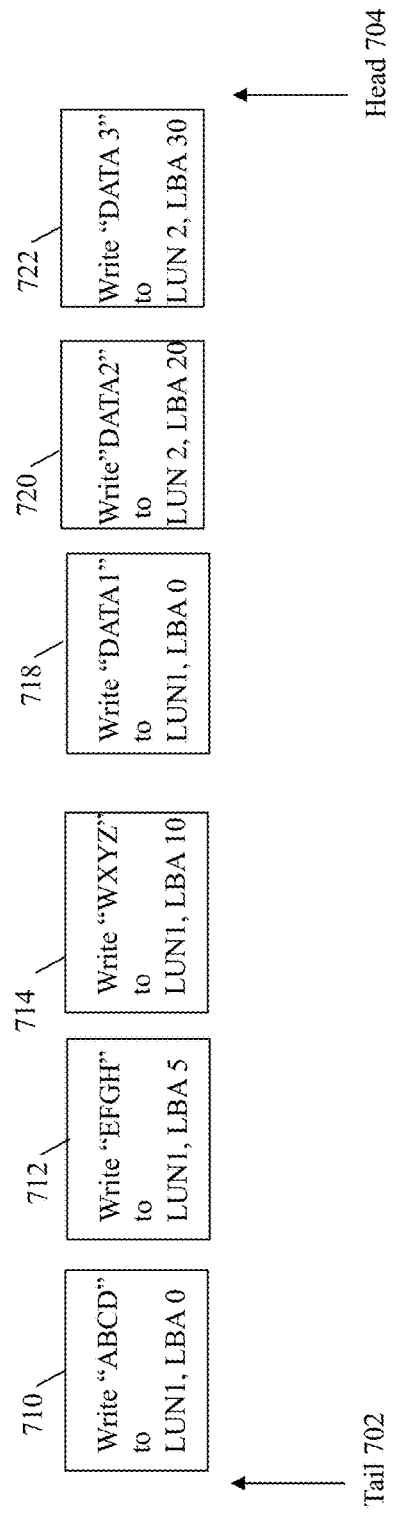

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
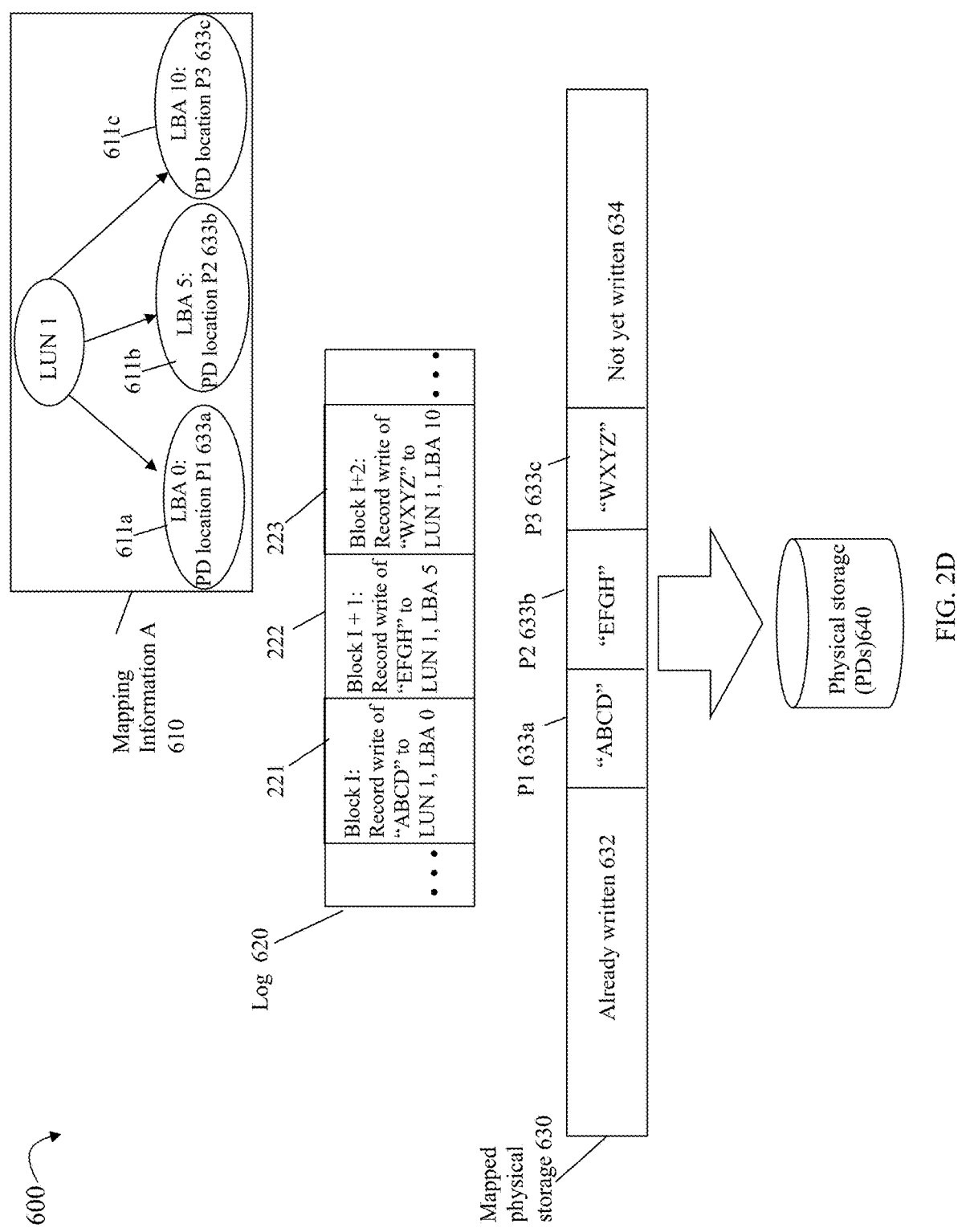

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 61 la-c denoting the mapping information, respectively, for the 3 target logical address of the 3 recorded write I/O operations in the log records 221, 222, and 223. The element 611*a* of the mapping information denotes the mapping information for the target logical address LUNI, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUNI, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is layed out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Thus in at least one embodiment, the data storage system can maintain the user data (UD) or client data, as stored persistently on non-volatile BE storage, as an LSS which can be characterized by not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

In at least one embodiment consistent with other discussion herein, a write I/O such as from a host or other storage client can be received at the storage system. The write I/O can write UD to a logical address. The storage system can persistently record the write I/O in an entry of the UD log (also sometimes referred to simply as a log), and then return an acknowledgement regarding completion of the write I/O to the host or other client that sent the write I/O. At a later point in time, the entry of the recorded write I/O can be flushed from the UD log. In at least one embodiment, entries of the UD log can be flushed by performing a flush workflow or flush processing of recorded UD log entries. In at least one embodiment, flush workflow processing for a recorded write I/O of the UD log can include: creating and/or updating one or more metadata (MD) pages of a chain of MD pages denoting mapping information that maps a logical address LA1 to a corresponding physical address or location PA1 on BE non-volatile storage, where LA1 is the logical address written to by the recorded write I/O and where PA1 is the content written by the recorded write I/O.

Consistent with other discussion herein, a data storage system, can receive write I/Os from storage clients, such as external hosts. A write I/O can be a request to write content or data to a target location, such as a target logical address. To achieve lower I/O response times, the storage system can persistently record each write I/O in a log (sometimes referred to as a user data (UD) log), and then return a response acknowledging completion of the write I/O. Recording the write I/O in the log can include persistently recording i) the data or content written along with ii) corresponding metadata (MD) for the write I/O. At some time later, the recorded write I/O can be flushed from the log, such as by background processing, to store the corresponding written content or data on back-end (BE) non-volatile storage associated with the target location. The storage system can persistently record the write I/O in the log prior to acknowledging the write I/O to the host to prevent data loss, for example, in case of a high-availability (HA) event or power-outage.

The MD of the write I/O recorded in the log can generally include information describing the write I/O such as, for example, the target location, such as the target logical address. The target logical address can identify, for example, a target device and location on the target device. The target device can be, for example, a logical device, and the location on the target device can be, for example, a logical block address (LBA) or offset denoting a particular location on the target device. In at least one embodiment, the write I/O MD stored in the log can also be referred to as a descriptor for the recorded write I/O that writes corresponding content or data also stored in the log. The log can be persistently stored on a persistent or non-volatile storage device sometimes also referred to as the log device. Thus for each write I/O, the log, and log device, can be used to persistently record both the write data and the corresponding descriptor or metadata of the write I/O.

One choice for a log device can be an NVRAM (non-volatile random access memory) device, such as an NVMe® (Nonvolatile Memory Express) PCIe® (Peripheral Component Interconnect Express) block device. The NVRAM device can be characterized as a high performance and high endurance storage device that can be used for persistently storing the log. However, use of such an NVRAM device can have a limited lifetime and may require using new types of storage devices from different vendors such as every few years.

Rather than use NVRAM devices for storing the log, it can be desirable to use other forms of persistent storage devices, such as solid state storage devices (SSDs), for log devices. As noted above, recording a write I/O in the log can include storing the related metadata or a descriptor for the write I/O. The size of this metadata or descriptor for the write I/O can be less than the size of the IU (indirection unit) of the SSD. The IU can denote the native internal block size of the SSD. The SSD normally handles a small write, such as the write I/O metadata or descriptor, having a corresponding size that is less than the IU size by performing an internal read-modify-write (RMW) operation. For the RMW operation, the SSD can read existing content of a stored block (e.g., of the IU size), determine modified content of the block such as by performing a logical OR operation of the existing content of the block with the new data or content written, and then writing out the modified content to the block. Thus a small write to the SSD, where the small write has an associated data payload that is less than the SSD's IU size, results in using internal capabilities of the SSD in performing the foregoing RMW operation to store content internally in the SSD in IU size blocks. In contrast, performing a write to the SSD that is a multiple of the SSD's IU size can be done without having the SSD perform the internal RMW operation. The maximum IOPS (I/Os per second) that the SSD can sustain for writes whose size is less than its IU is often much less than the maximum sustained IOPS for IU-sized writes. NVRAM devices, unlike SSD devices, do not have this same small write performance penalty when storing host write I/O metadata due to the typically smaller IU size of the NVRAM device. For example, the native or internal block size (e.g., IU) of the NVRAM device is typically smaller than the SSD's IU size so that the host write I/O metadata can be a multiple of the NVRAM device's smaller IU. For example, the size of the metadata for a host write I/O can be 512 bytes and the IU of the NVRAM device can be 512 bytes. In contrast, although the SSD can allow writes of 512 bytes, the IU size of an SSD can be, for example, 4 KB whereby the 512 byte write to the SSD triggers the SSD internal RMW operation to store the 512 bytes written into a 4 KB block on the SSD. Thus an NVRAM device can avoid the foregoing small write performance penalty incurred with the SSD, where the SSD typically has a relatively larger IU size than the NVRAM device.

Accordingly, the techniques of the present disclosure can be utilized in at least one embodiment by coalescing metadata or descriptors for recorded host write I/Os of the log in efforts to maximize host IOPS and bandwidth that can be achieved using an SSD as the log device. It should be noted that although the techniques of the present disclosure can be described with respect to use of an SSD, more generally the techniques of the present disclosure can be used with any suitable non-volatile or persistent storage device used as the log device generally having a larger IU size than the size of record of host write I/O metadata stored in the log device, where multiple instances of host write I/O metadata for corresponding multiple host write I/Os can be coalesced and stored in a single IU unit of storage of the log device.

In at least one embodiment, the log used to record write I/Os can include a first log for storing data or content written and a second log for storing the write I/O metadata or descriptors. The second log can sometimes also be referred to as a metadata log, a descriptor log, or a page descriptor (PDESC) log. Both the first log and the second log can be stored persistently on the log device, where the log device can be an SSD with an IU size. The size or amount of metadata stored in the second log for each recorded host write I/O can be smaller than the SSD's IU size. In at least one embodiment, M portions of metadata for M corresponding host write I/Os recorded in the log can have a corresponding size equal to the IU size of the SSD. Put another way in at least one embodiment, M metadata portions or descriptors can be stored in a single SSD storage block of the IU size. In at least one embodiment, M metadata portions can be written in a single write to the log device where the single write has a corresponding data payload equal to the SSD's IU size.

In at least one embodiment, the techniques of the present disclosure provide for coalescing the write I/O metadata or descriptors persistently stored in the metadata log or descriptor log. Coalescing can include collecting a set of metadata log write I/O requests, that write descriptors of storage client write I/Os, and aggregating them into a single write request to the metadata log stored on the log device. In at least one embodiment where the log device storing the metadata log is an SSD with an IU size, the requests to write the descriptors to the metadata log can be aggregated such that the aggregated write of such descriptors is a single write to the metadata log, where the single write is the IU size, or more generally, a multiple of the IU size of the log device. Additionally in at least one embodiment, to accommodate for host or storage client workload periods having a low write I/O workload or other delays in processing storage client write I/Os, a maximum amount of wait time, MAX, can be specified. MAX can denote the maximum amount of time to wait collecting or aggregating metadata log I/O write requests of descriptors into the single write that is an IU size multiple. If the maximum wait time is reached prior to collecting or accumulating a single aggregated write that is an IU size multiple, the metadata log I/O write requests of descriptors collected within the maximum wait time can be written out to the metadata or descriptor log even though the size of the single aggregated write is not a multiple of the log device's IU size. In at least one embodiment for a host write I/O, once the host write I/O write data and an aggregated write including the host write I/O's descriptor have been persistently stored or written to the log device, an acknowledgement can be returned to the host that issued the host write I/O.

In at least one embodiment, the techniques of the present disclosure provide for minimizing host I/O latency when the current host IOPS and bandwidth requirements are below corresponding thresholds based, at least in part, on the maximum limits or capabilities of the log device. Generally, coalescing can increase the maximum host IOPS processed where the SSD's IOPS limit for small writes (e.g., writes less than an IU amount of data) is a performance bottleneck. However, coalescing can extend I/O latency as coalescing can incur additional latency while waiting for descriptors to aggregate such as prior to writing out such descriptors to the log device in a single write that is the size of the IU, or more generally a multiple thereof.

Accordingly in at least one embodiment, the techniques of the present disclosure provide for adaptive coalescing to preserve low latency for low host write I/O rates while also improving maximum IOPS performance with minimal latency impact for high host write I/O rates. In at least one embodiment, the techniques of the present disclosure provide for monitoring, on a periodic basis, i) the number of host write I/Os or host write IOPS rate and ii) the average size of such writes I/O received during period N to determine, for period N+1, whether to perform aggregation of the host write I/O metadata or descriptors stored on the log device. In at least one embodiment, if either i) the foregoing host write IOPS rate for the average size of write I/Os for period N exceeds a corresponding write IOPS threshold, or ii) a bandwidth or data rate of content written to the log device exceeds a corresponding bandwidth threshold, processing can be performed to aggregate and coalesce host write I/O descriptors for period N+1. In at least one embodiment, if both of the foregoing write IOPS and bandwidth thresholds for time period N are not exceeded, such aggregation and coalescing of host write I/O metadata or descriptors can cease, disengage or be disabled for time period N+1 to thereby decrease the I/O latency experienced in connection with host I/Os. In at least one embodiment, the foregoing thresholds can be based, at least in part, on the maximum limits or capabilities of the log device.

In at least one embodiment, the techniques of the present disclosure can be used in a dual node, or more generally a multi-node, storage system, where each node can receive host or storage client write I/Os for processing. In at least one embodiment, the multiple nodes i) can share a single log device, and ii) can share a single metadata or descriptor log stored on the log device. Each node can have its own aggregation queue to aggregate descriptor allocation requests for space allocation of the descriptor or metadata log. Thus in at least one embodiment, processing can collect or aggregate descriptor or metadata log space allocation requests of a node in the node's own private descriptor allocation aggregation queue that can be used only by the respective node for collecting or accumulating requests. In at least one embodiment, descriptor allocation requests can also be collected or aggregated until the earliest of the following occurs i) a maximum size of the aggregated descriptor allocation requests is reached, or ii) a maximum delay time or wait time is reached. In at least one embodiment if either of the foregoing occurs, a descriptor or metadata log space allocation can be performed based on the total size of the aggregated descriptor allocation requests. The foregoing maximum size in at least one embodiment can be the IU size of the SSD used as the log device. More generally in at least one embodiment, the foregoing maximum size can be a multiple of the log device's IU size. The total size of the aggregated requests can be equal to the maximum size. If the maximum wait time is reached prior to the aggregated allocation requests reaching the maximum size, then the total size of the aggregated requests can be less than the maximum size.

The techniques of the present disclosure can further provide for coordinating metadata or descriptor log space allocations among the multiple nodes based, at least in part, on a sequential time order of associated descriptor allocation requests.

Thus in at least one embodiment, coalescing and aggregation can be performed for space allocation from the descriptor or metadata log as well as for writing to the descriptor or metadata log.

The foregoing as well as other aspects of the techniques of the present disclosure are described in more detail in the following paragraphs.

Figure 3:
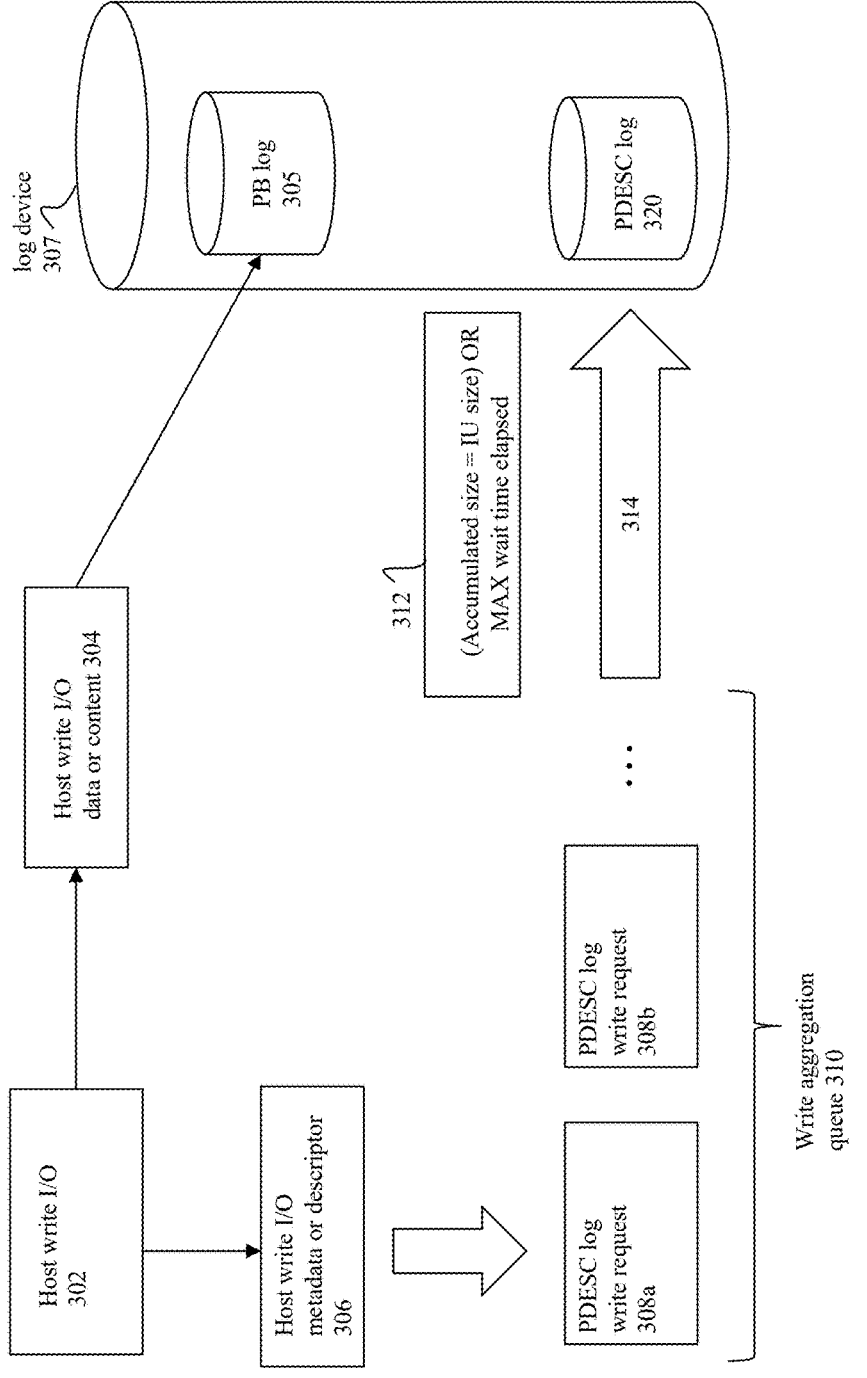
FIGS. 3, 4, 5 and 6 are examples illustrating various allocation and aggregation queues that can be used in at least one embodiment in accordance with the techniques of the present disclosure.

Referring to FIG. 3, shown is an example 300 of components and associated processing and workflow in at least one embodiment in accordance with the techniques of the present disclosure.

In at least one embodiment, each host or storage client write I/O operation 302 can write content or data to a target location, such as a target logical address. Thus each host write I/O 302 can include associated content or data written 304 and associated metadata 306 describing the host write I/O operation. The metadata 306 of the host write I/O operation can be a descriptor that includes the target logical address and optionally other information about the host write I/O operation. In at least one embodiment, the descriptor or metadata of a host write I/O operation can reference or point to a log device location of the corresponding content of the same host write I/O operation. For example in at least one embodiment, the metadata or descriptor 306 can include other information, where the other information can include a reference to the log device location of where the host write I/O content 304 is stored.

In response to receiving the host write I/O operation, the host write I/O operation can be persistently recorded in a log stored on a log device such as an SSD having a corresponding IU size. In at least one embodiment, the log can include a PB (page buffer) log 305 and a PDESC (page descriptor) log or metadata log 320. The PB log (sometimes referred to as the data log) can include PBs used for storing content, such as 304, written by host write I/Os. The PDESC log (also sometimes referred to as a metadata log or descriptor log) can include PDESCs or descriptors used for storing metadata, such as 306, about host write I/Os. In at least one embodiment, recording the host write I/O operation 302 in the log can include: i) storing the content or data written 304 by host write I/O operation 302 in a PB of the PB log 305, and ii) storing metadata 306 describing the host write I/O operation 302 in a PDESC or descriptor of the PDESC log 320.

In at least one embodiment, the log, including the PB log 305 and PDESC log or metadata log 320, can be included in the log device 307. In at least one embodiment, the log device 307 can be the SSD noted above having the corresponding IU size.

The IU size of the SSD used as the log device can denote the native block size internally within the SSD. When a write to the SSD is less than the IU size, the SSD can internally perform a read modify write or RMW operation with respect to an offset or location LOC1 on the SSD. In at least one embodiment, the RMW operation can be an atomic operation that reads existing content from a block or unit of storage the size of an IU from LOC1, modifies the existing content to store the written content (such as by logically ORing the existing content of the block with the written content), and then writes the modified results of the IU unit or block of storage to LOC1. When a write to the SSD is equal to the IU size, or more generally a multiple of the IU size, the content can be written out to the SSD using a write operation without having the SSD perform any internal RMW operation. Due to the RMW operation performed for writes less than the SSD's IU size, the maximum IOPS that the SSD can sustain for writes whose size is less than its IU is often much less than the maximum IOPs that the SSD can sustain for writes whose size is equal to its IU. Thus to avoid or at least minimize the foregoing write performance penalty when writing to a log device that is an SSD, an embodiment can utilize the techniques of the present disclosure that includes coalescing writes to the SSD used as the log device.

In at least one embodiment, data or content 304 written by a host write I/O can be a multiple of the IU size. For example, a host write I/O can write 4 KB of data where the IU size is also 4 KB. Generally, the size of a single PDESC of metadata for the host write I/O can be much smaller than the IU size. For example, in at least one embodiment, for each host write I/O, 512 bytes of metadata can be stored in a PDESC, whereby the collective size of 8 PDESCs can be equal to the IU size of 4 KB. Thus, writing or storing the write data of a host write I/O to the PB log can be performed by writing an individual PB which can be the IU size. In efforts to avoid and/or reduce the above-noted write performance penalty that can be incurred when writing a single PDESC (having a size smaller than the IU size) to the PDESC log, an embodiment can utilize the techniques of the present disclosure that coalesces writing PDESCs or metadata for host write I/Os to the SSD used as the log device.

In at least one embodiment, the techniques of the present disclosure provide for coalescing or collecting a set of PDESC log write requests and aggregating them into a single write request to the PDESC log, or more generally, the SSD used as the log device. The size of the aggregated single write request can be the IU size of the SSD, or more generally, a multiple of the SSD IU size. Additionally, to cover for periods with low amounts of host I/O writes or other delays in the storage system processing those host I/O writes, an embodiment can specify a maximum time to wait (MAX) for collecting or aggregating PDESC log write requests into an aggregated write request of the SSD's IU size. If MAX, the maximum wait time, is reached, the size of the single aggregated write to the log device will not be a multiple of the SSD IU size, but the number of non-IU-sized writes to the device will have been reduced (and result in a positive performance impact). Generally, processing can be performed to collect or aggregate PDESC log write requests for no more than the MAX wait time, before proceeding to write out the collected PDESC log writes to the PDESC log of the log device.

More specifically with reference to FIG. 3, metadata or PDESC log write requests can be queued in the write aggregation queue 310. For example, for the host write I/O 302, the PDESC log write request 308a can be placed in the write aggregation queue 310, where the PDESC log write request 308a can be a write request to store the corresponding host write I/O metadata or descriptor 306 in the PDESC log 320 of the log device. Thus generally each element or entry of the write aggregation queue 310 can be a request to write metadata or a descriptor for a corresponding host write I/O to a PDESC of the PDESC log 320. For example, element 308b can denote another second write request to write corresponding host write I/O metadata to a second PDESC of the PDESC log 320 for a second host write I/O operation (not illustrated in FIG. 3).

The write aggregation queue 310 can be monitored from both a size and a wait time perspective. In at least one embodiment, PDESC log write requests 308a-b can be added to the queue 310 until (as denoted by 312) either i) the total accumulated size of the aggregated PDESC log write requests in 310 reaches a desired size, such as the SSD IU size, or ii) the maximum allowed wait time (MAX) has elapsed. If either of the foregoing occurs, the set of queued PDESC log write requests in the queue 310 can be aggregated into a single aggregated write request that is then sent (314) to the PDESC log of the log device. For example, assume that the IU size=4 KB, that the MAX time has not elapsed, and that there are 8 PDESC log write requests in the write aggregation queue 310 having a total size of 4 KB (e.g., each PDESC log write request writes 512 bytes of metadata for a corresponding host write I/O). In this case, the 8 PDESC log write requests can be combined into a single aggregated write request that is sent or written to (314) the PDESC log of the log device. Once the aggregated write request completes and the corresponding host write I/O data 304 has also been written to the PB log 305 of the log device, the host write I/O 302 can be acknowledged back to the host that issued the write I/O 302. More generally, once the aggregated write request completes and the corresponding host write I/O data (for the corresponding 8 host write I/Os having the 8 PDESC log write requests) is written to the PB log of the log device, the corresponding 8 host write I/Os can be acknowledged back to the originating respective one or more hosts. It should be noted that in this example, each of the 8 host write I/Os can be individually acknowledged once each such host I/O's write data and metadata or descriptor have been stored, respectively, in the PB log and PDESC log of the log device.

As another second example, assume that i) the IU size=4 KB, ii) there are only two (2) PDESC log write requests 308a-b in the write aggregation queue 310 having a total size that is less than 4 KB, and iii) the MAX amount of time has elapsed. Put another way, in this latter second example, the MAX amount of time has elapsed waiting for PDESC log write requests to accumulate or collect in the queue 310. In this case, the 2 PDESC log write requests 308a-b can be combined into a single aggregated write request that is sent or written to (314) the PDESC log of the log device even though the total size of the 2 PDESC log write requests is less than the IU size of log device. Once the aggregated write request completes and the corresponding host write I/O data 304 has also been written to the PB log 305 of the log device, the host write I/O 302 can be acknowledged back to the host that issued the write I/O 302. More generally, once the aggregated write request completes and the corresponding host write I/O data (for the corresponding 2 host write I/Os having the 2 PDESC log write requests 308a-b) is written to the PB log of the log device, the corresponding 2 host write I/Os can be acknowledged back to the originating respective one or more hosts. It should be noted that in this example, each of the 2 host write I/Os can be individually acknowledged once each such host I/O's write data and metadata or descriptor have been stored, respectively, in the PB log and PDESC log of the log device.

In some embodiments, the location or particular entry in the PDESC log that is assigned or allocated for storing the metadata or descriptor associated with a given host write I/O can be determined at a separate point in the handling or workflow of the host write I/O than when the corresponding metadata or descriptor is actually written to the log device. In such an embodiment since there may be no guarantee that the metadata or PDESC log writes to the PDESC log for separate host write I/Os will arrive in the same time-order as their assigned location or entry in the log, the write aggregation queue 310 can be managed as a set of aggregates, where each of the aggregates can include a corresponding set of PDESC log write requests, and where each of the aggregates (e.g., or each set of PDESC log write requests) can be processed independently. In this case in at least one embodiment, a PDESC log write request to write metadata for a host write I/O can be queued to an aggregate on the write aggregation queue, where each aggregate contains a contiguous range of log locations of the PDESC log. Each such aggregate or set of PDESC log write requests can be independently assessed based on its size and amount of wait time that has elapsed for collecting or aggregating PDESC log write I/O requests of the aggregate or set. For example in at least one embodiment, the PDESC log can include entries, slots or locations having corresponding entry identifiers or IDs corresponding to the relative sequential consecutive ordering of such entries in the PDESC log. For example, PDESC log entries can have corresponding IDs forming a contiguous range of integers corresponding to the relative position of the consecutive locations of the entries within the PDESC log. In at least one embodiment, the PDESC log entries of the PDESC log can be partitioned into aggregates or segments, where each aggregate or segment has a number of PDESC log entries with consecutive PDESC log entry IDs to thereby denote a contiguous set of PDESC log entries or locations.

In at least one embodiment, M1 PDESC log entries can have an aggregated size equal to the IU size of the log device (e.g., M1 PDESC log entries can be coalesced into a single write that has a corresponding size equal to the IU size). Consider an example where the size of a segment or aggregate allocated can be the IU size of the log device such that the segment includes M1 contiguous PDESC log entries used for storing M1 metadata portions for M1 corresponding host write I/Os. Processing can be performed to collect or accumulate the written metadata portions in the segment. If write requests to write the M1 portions of metadata for the M1 corresponding host write I/Os are collected or accumulated within the MAX wait time, the M1 metadata portions can be combined into a single aggregated write to the segment, where the single aggregated write has a corresponding size=IU size of the log device. In at least one embodiment, where less than M1 portions of metadata for corresponding host write I/Os are collected or accumulated within the MAX wait time in a single segment or aggregate, the size of the aggregated write is less than the IU size of the log device.

To further illustrate in at least one embodiment, consider an example where a slot, entry or location in the PDESC log is assigned or allocated for storing corresponding metadata for a particular host write I/O at one point in time, and where the allocated or assigned PDESC log entry, slot or location in then written to or filled in at a later point in time. For simplicity, assume that M1=4 and that an aggregate or segment includes contiguous PDESC log entries 1-4. Assume that 4 host write I/Os W1, W2, W3 and W4 are received at a first point in time T1 in the foregoing consecutive order such that W1 is assigned PDESC log entry 1, W2 is assigned PDESC log entry 2, W3 is assigned PDESC log entry 3, and W4 is assigned PDESC log entry 4. The foregoing PDESC log entries 1-4 can collectively have a size equal to the IU size of the SSD used as the log device. PDESC log entries 1-4 can denote a contiguous range of PDESC log locations of the aggregate or segment. At time T2 following time T1, metadata for W3 can be received and corresponding PDESC log write request R3 added to the write aggregation queue 310, where R3 requests that W3 metadata be written to PDESC log entry 3. At time T3 following time T2, metadata for W1 can be received and a corresponding PDESC log write request R1 added to the write aggregation queue 310, where R1 requests that W1 metadata be written to PDESC log entry 1. At time T4 following time T3, metadata for W2 can be received and a corresponding PDESC log write request R2 added to the write aggregation queue 310, where R2 requests that W2 metadata be written to PDESC log entry 2. At time T5 following T4, metadata for W4 can be received and a corresponding PDESC log write request R4 can be added to the write aggregation queue 310, where R4 requests that W4 metadata be written to PDESC log entry 4. At this point T5 as denoted by element 312 of FIG. 3, processing can determine the accumulated size of PDESC log write requests R1-R4 of the aggregate is equal to the log device IU size, where R1-R4 can be aggregated into a single aggregated write sent (314) to the PDESC log 320, where the single write writes corresponding metadata for W1-W4 respectively to PDESC log entries 1-4, and where the single write has an I/O size equal to the IU size of the SSD used as the log device. The foregoing is an improvement over an implementation that does not coalesce multiple PDESC log write requests writing metadata for multiple corresponding host write I/Os where such an implementation may otherwise issue 4 separate write requests to the PDESC log each triggering the log device to perform an internal RMW operation to complete the respective write request.

As a variation to the foregoing example, assume that requests R3, R1 and R2 are added to the write aggregation queue 310 as noted above at times T2, T3 and T4. However in this variation, assume that at T5, metadata for W4 is not received. Assume that at time T5, processing is performed as denoted by element 312 that determines the MAX wait time has elapsed for the aggregate of PDESC log entries 1-4 even though the queue 310 does not include a write request for writing W4 metadata whereby the accumulated size is less than the IU size. As such at time T5, processing can be performed to aggregate R1-R3 in a single write W11 sent to the PDESC log 3210, where the single write W11 writes corresponding metadata for W1-W3 respectively to PDESC log entries 1-3. At time T6 subsequent to T5, metadata for W4 can be received and a corresponding PDESC log write request R4 can be added to the write aggregation queue 310, where R4 requests that W4 metadata be written to PDESC log entry 4. In this example, R4 can result in another write W12 being issued to the PDESC log 320 to write W4 metadata to PDESC log entry 4. In this latter example or variation, both the aggregated write request W11 at T5 and the other write request W12 do not having corresponding data payloads equal to the IU size of the SSD used as the log device and can each result in the log device performing a RMW operation to complete the respective writes W11, W12. However, the foregoing is still an improvement over an implementation that does not coalesce multiple PDESC log write requests writing metadata for multiple corresponding host write I/Os.

In at least one embodiment, MAX denoting the maximum wait time discussed above can be based, at least in part, on the host I/O timeout threshold (e.g., the maximum amount of time a host can wait for an acknowledgement from the storage system regarding a host I/O operation sent to the storage system before the host experiences a timeout error or condition). In at least one embodiment, MAX can be selected to avoid triggering a host timeout error or condition.

As a result of coalescing and aggregating multiple PDESC log write requests associated with multiple corresponding host I/Os, the amount of time that lapses before the storage system also sends corresponding acknowledgements can also increase. Thus coalescing can result in a performance improvement with higher host IOPS and bandwidth. However, coalescing can also adversely affect and increase host I/O latency. Generally, with low host write I/O workload below a specified threshold, the SSD can perform internal RMW operations resulting from writes that are less than the SSD's IU size without having an unacceptable impact on log device performance. In at least one embodiment, with a host write I/O workload below the specified threshold, it can be a disadvantage to perform the coalescing of multiple PDESC log write requests due to the increase in host I/O latency caused by the coalescing.

In at least one embodiment, the techniques of the present disclosure can be utilized to minimize host I/O latency when host or client write I/O workload is below a specified limit based, at least in part, on one or more limits or capabilities of the SSD. In at least one embodiment, the techniques of the present disclosure can minimize host latency when the host write IOPS and host write bandwidth requirements with respect to the SSD log device are below corresponding limits based on the SSD's capabilities. For example in at least one embodiment, the host write I/O workload can be based, at least in part, on host write IOPS and the average size of such host write IOPS. For host write I/Os of the observed average write I/O size, if the observed host write IOPS (e.g., host I/O write rate for write I/Os of the observed average size) is less than a host write IOPS limit or threshold, then coalescing and aggregation of PDESC log write requests can be turned off, for at least a subsequent amount of time, so that each PDESC log write can be performed independently to the PDESC log of the log device. In this manner, the techniques of the present disclosure can provide for switching between maximizing host IOPS and minimizing host I/O latency impact.

In scenarios where the SSD's IOPS limit for small writes (each less than the SSD's IU size) is a performance bottleneck, coalescing can reduce this bottleneck and increase the maximum host write IOPS performed. However, as coalescing involves aggregating metadata from several write I/O operations together, coalescing extends I/O handling latency (as it waits for metadata of multiple host write I/O's to aggregate), which can be detrimental to host latency at low host write I/O rates or low host write IOPS rates. Accordingly in at least one embodiment, the techniques of the present disclosure can provide for adaptive coalescing to thereby allow preserving low I/O latency for low host write I/O rates while improving maximum IOPS performance with minimal latency impact for high host write IO rates.

In at least one embodiment, the techniques of the present disclosure provide for monitoring, on a periodic basis, i) the number of host write I/Os or host write IOPS rate and ii) the average size of such writes I/O received during period N to determine, for period N+1, whether to perform aggregation of the host write I/O metadata or descriptors stored on the log device. In at least one embodiment, the bandwidth or data rate of data written to the log device during time period N can be estimated based on i) the host write IOPS for period N, ii) the average size of write I/Os for period N, and iii) the size of each descriptor of metadata written for each write I/O in period N. In at least one embodiment, the bandwidth or data rate of data written to the log device during time period N can be estimated as in EQUATION 1 below:

$$BW = \text{host write } IOPS*(\text{average write } I/O \text{ size} + MD \text{ size}) \qquad \text{EQUATION 1}$$

where
BW denotes the bandwidth being calculated for time period N where BW can be expressed as a rate or amount of data per unit of time, such as per second;
host write IOPS denotes the host write I/O rate per second measured during time period N;
average write I/O size denotes the average size of host write I/Os received during time period N; and
MD size denotes the size of the metadata or descriptor written to the PDESC log for each host write I/O operation.

More generally, an embodiment can use other suitable techniques to estimate or measure the BW with respect to the rate at which data is written to the log device during time period N.

In at least one embodiment, based on the foregoing host write IOPS rate for write I/Os of the average size for period N, if i) the host write IOPS rate for period N exceeds a corresponding write IOPS threshold, or ii) the estimated bandwidth (such as based on EQUATION 1) or data rate of data written to the log device during time period N exceeds a corresponding bandwidth threshold, processing can be performed to aggregate and coalesce host write I/O descriptors, and thus aggregate PDESC log write requests, for period N+1. Otherwise, if the foregoing write IOPS threshold is not exceeded and the foregoing bandwidth threshold is not exceeded, then aggregation and coalescing of host write I/O metadata or descriptors can be turned off for period N+1 to thereby decrease the I/O latency experienced in connection with host I/Os.

In at least one embodiment as a variation to EQUATION 1, the estimated BW can be determined based on the host write IOPS and average write I/O size without considering the MD size. Such a rationale can be based on, for example, the fact that the primary contribution to log device bandwidth consumption can be based on the host write IOPS and the average write I/Os.

In at least one embodiment, various thresholds such as the write IOPS threshold and bandwidth threshold can be selected based, at least in part, on the log drive maximum limits or capabilities. In at least one embodiment such thresholds can be selected as a percentage of the drive limits and capabilities, where a selected threshold can be a percentage of a corresponding maximum drive limit or capability. For example in at least one embodiment, max SSD write IOPS can denote the maximum write rate the SSD log device can be capable of. In at least one embodiment the max SSD write IOPS can be based, at least in part, on write I/Os of the average size host write I/O. In at least one embodiment, the write IOPS threshold can be selected as a percentage of the max SSD write IOPS. For example in at least one embodiment, the write IOPS threshold can be 80% of the max SSD write IOPS for the particular SSD used as the log device. As another example in at least one embodiment, max SSD bandwidth can denote the maximum data rate (e.g., amount of data per second) or maximum bandwidth capability of the SSD used as the log device. In at least one embodiment, the bandwidth threshold can be selected as a percentage of the max SSD bandwidth. For example in at least one embodiment, the bandwidth threshold can be 80% of the max SSD bandwidth for the particular SSD used as the log device.

In at least one embodiment, the particular one or more factors affecting the max SSD write IOPS, the write IOPS threshold, the max SSD bandwidth and/or the bandwidth threshold can depend on the particular log device such as the SSD used as the log device. For example using an SSD as the log device in at least one embodiment, one factor affecting the foregoing max SSD capabilities and thresholds can be the average size host write I/O such that the SSD capabilities with respect to maximum write IOPS and maximum bandwidth can vary with the average host write I/O size.

In at least one embodiment, the foregoing write IOPS threshold can vary with the average write I/O size. Given a specified average host write I/O size, a corresponding write IOPS threshold can be determined based, at least in part, on the maximum limits or capabilities of the log device. For example, the write IOPS threshold can be based, at least in part, on the maximum write IOPS the log drive is capable of when write I/Os have an I/O size equal to the above-noted average host I/O size. For example, the write IOPS threshold can be 80% of the log device's write IOPS limits or capabilities when the write I/Os have an I/O size of the above-noted average size. For example, for a write I/O size of 16 KB, X write IOPS may denote the 80% limit or capability of write IOPS of the log device. If the write I/O size is much smaller such as 4 KB, the write IOPS rate can be much larger than X before the log drive is at its 80% write IOPS threshold limit or capability. Thus for a write I/O size of 4 KB, the write IOPS threshold can be larger than X write IOPS (where X denotes the write IOPS threshold for the larger 16 KB average write size).

In at least one embodiment, the log drive limits or capabilities for particular write IOPS and write I/O sizes can be determined in any suitable manner. For example, log drive limits or capabilities can be based on vendor supplied information, benchmark tests, and other suitable means.

Generally, the above-noted metrics or parameters of i) the number of host write I/Os or host write IOPS rate during a time period and ii) the average size of such writes I/O received during the time period can be used in at least one embodiment in connection with estimating the write I/O workload on the log device. As a variation, an embodiment can measure for time period N: i) the write IOPS or write rate of writes sent to the log device, and ii) the bandwidth or data rate at which write data is sent or written to the log device. If i) the observed or measured write IOPS or write rate for writes sent to the log device is above a write IOPS threshold for time period N, or ii) the observed or measured data bandwidth or rate at which write data is written to the log device is above a bandwidth threshold for time period N, then processing can be performed in time period N+1 to aggregate and coalesce host write I/O descriptors, and thus aggregate PDESC log write requests. If both of the foregoing observed or measured write IOPS and data bandwidth do not exceed corresponding thresholds in time period N, such aggregation and coalescing of host write I/O metadata or descriptors (e.g., PDESC log write requests) can cease or be turned off for time period N+1. In at least one embodiment, the foregoing thresholds can be based, at least in part, on the maximum limits or capabilities of the log device.

Thus in at least one embodiment, when the write I/O workload results in approaching one or more of the log device limits or capabilities, such as in terms of exceeding write bandwidth and write IOPS thresholds, the techniques of the present disclosure provide for enabling or engaging coalescing and aggregation of PDESC log write requests that write metadata or descriptors of host write I/Os to the PDESC log of the log device. Once the write I/O workload results in falling below log device limits or capabilities, such as by not exceeding the write bandwidth and write IOPS thresholds, at least one embodiment of the techniques of the present disclosure disables or disengages the foregoing coalescing and aggregations thereby decreasing the latency as seen by one or more hosts. Put another way in at least one embodiment, the techniques of the present disclosure are dynamic and adaptive in that they provide for determining whether or not to perform coalescing of PDESC log write requests based on one or more metrics characterizing the current host write I/O workload and thus characterizing the current resource demands or requirements with respect to the capabilities of the log device. If such resource demands of the log device for the current host write I/O workload are above a threshold level, then coalescing and aggregation of PDESC log write requests that write metadata or descriptors of host write I/Os to the PDESC log of the log device can be performed, to thereby allow for an increased maximum number of host write IOPS that can be performed. Otherwise, if such resource demands of the log device for the current host write I/O workload are not above the threshold level, then the foregoing coalescing and aggregation of PDESC log write requests can be turned off or not performed, to thereby allow for a reduced host I/O latency impact. If such resource demands of the log device for the current host write I/O workload are not above the threshold level, then there are available log device resources available to perform the internal RMW operations incurred as a result of performing PDESC log write requests each of which can be a size that is less than the IU size of the SSD used as the log device.

In at least one embodiment, if the foregoing coalescing and aggregating of PDESC log write requests is disabled, each of the individual PDESC log write requests can be written out independently without aggregation to the PDESC log of the log device.

As noted above, in some embodiments, the allocation or assignment of a PDESC log entry and the writing of metadata to the PDESC log entry can occur at two different points in time in the workflow or processing of the corresponding host write I/O. In at least one such embodiment, the techniques of the present disclosure can provide for two phases or two stages of aggregation, where phase 1 relates to aggregating allocation requests for PDESC log entries and where phase 2 relates to aggregating write requests to write content to PDESC log entries (previously allocated or assigned). Thus FIG. 3 discussed above generally illustrates aggregating the PDESC log write requests of phase 2. In at least one embodiment, processing can also include performing a phase 1 aggregation prior to the phase 2 aggregation as discussed in more detail below.

Figure 4:
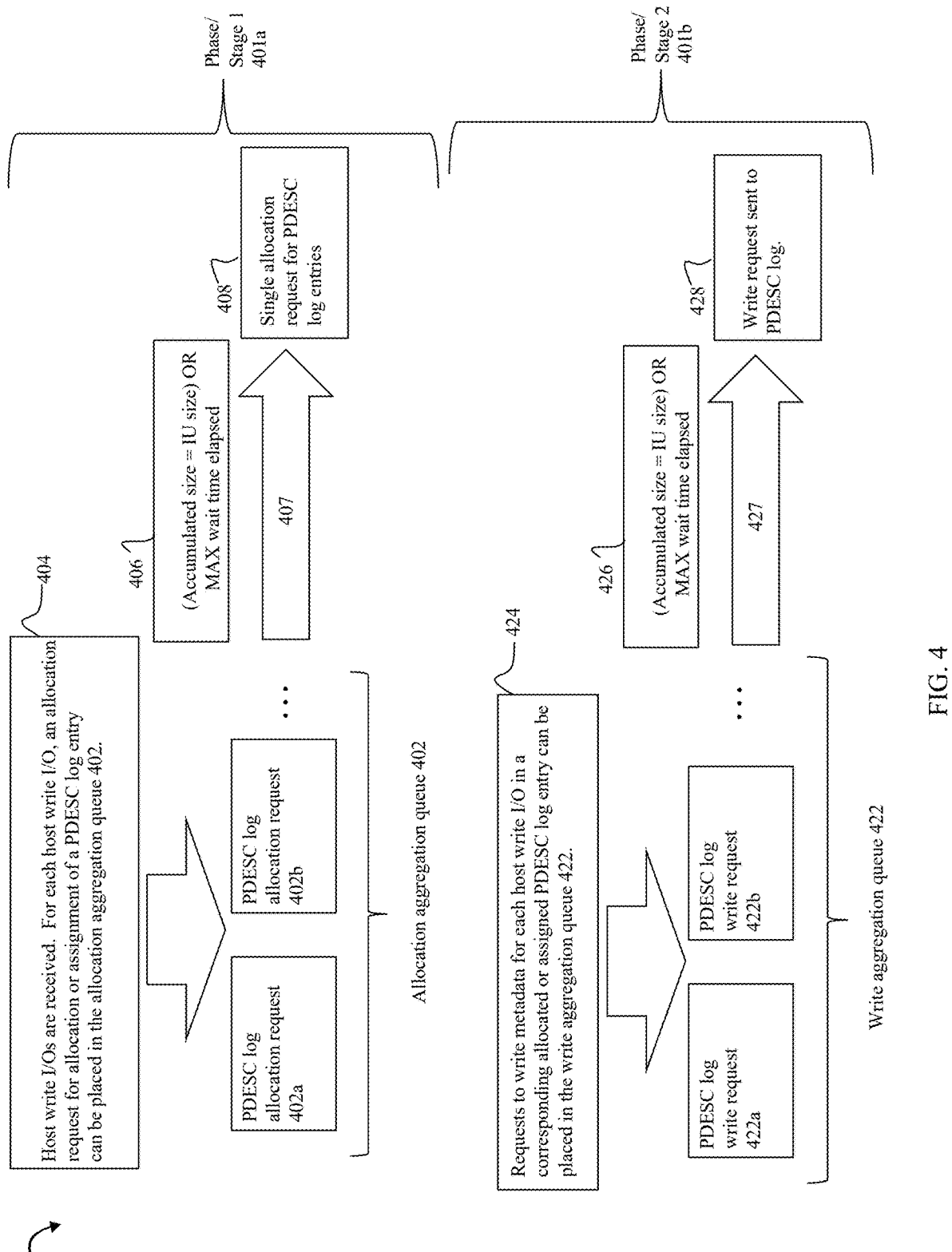

Referring to FIG. 4, shown is an example 400 illustrating two phases or stages of coalescing that can be performed in at least one embodiment in accordance with the techniques of the present disclosure.

The example 400 includes phase or stage 1 401a and phase or stage 2 401b each denoting a phase or stage in which requests can be coalesced. Phase 1 401a relate to aggregation of PDESC allocation requests, and phase 2 401b relates to aggregation of PDESC write requests.

With reference to element 404, multiple host write I/Os can be received. For each host write I/O, an allocation request for allocation or assignment of a PDESC log entry can be placed in the allocation aggregation queue 402. In at least one embodiment, allocation requests for corresponding host write I/Os can be placed in the allocation aggregation queue 402 based on the time order in which the host write I/Os are received and enqueued in the allocation aggregation queue 402. For example, for a first host write I/O W21, the PDESC log allocation request 402a can be placed in the allocation aggregation queue 402. The PDESC log allocation request 402a can be a first allocation request R21 for a first PDESC log entry of the log device, where the first PDESC log entry will be used for storing a corresponding host write I/O metadata or descriptor for W21. For a second host write I/O W22, the PDESC log allocation request 402b can be placed in the allocation aggregation queue 402. The PDESC log allocation request 402b can be a second allocation request R22 for a second PDESC log entry of the log device, where the second PDESC log entry will be used for storing a corresponding host write I/O metadata or descriptor for W22. Thus generally each element or entry of the allocation aggregation queue 310 can be a request for allocation or assignment of a PDESC log entry for metadata or a descriptor for a corresponding host write I/O.

In a manner similar to the write aggregation queue 310, the allocation requests (402a, 402b, . . . ) can be collected or accumulated in allocation aggregation queue 402. The host write I/Os can be received at various points in time resulting in generating corresponding PDESC log allocation requests that can be collected in the allocation aggregation queue.

The allocation aggregation queue 402 can be monitored from both a size and a wait time perspective. Generally, PDESC log allocation requests can be continually added to the allocation aggregation queue 402 until (as denoted by 406) either i) the total accumulated size of the aggregated PDESC log allocation requests in 402 reaches a desired size, such as the SSD IU size, or ii) the maximum allowed wait time (MAX) has elapsed. The total accumulated size can denote the total or aggregate size of the PDESC log entries that are being requested for allocation or assignment. If either of the foregoing occurs, the set of queued PDESC log allocation requests in the queue 402 can be aggregated into a single aggregated allocation request (408) for PDESC log space/entries resulting in allocation of a segment of PDESC log space/entries. The PDESC log entries allocated as a result of the request 408 can be contiguous PDESC log entries having consecutive contiguous PDESC log entry IDs. In at least one embodiment, the allocated PDESC log entries allocated in response to the request 408 can be included in the same segment or aggregate. For example, assume that the IU size=4 KB, that the MAX time has not elapsed, and that there are 8 PDESC log allocation requests in the allocation aggregation queue 402 having a total size of 4 KB (e.g., each PDESC log allocation requests allocation or assignment of a single PDESC log entry can be 512 bytes). In this case, the 8 PDESC log allocation requests (each requesting a PDESC log entry that is 512 bytes) can be combined into a single aggregated allocation request 408 for 8 PDESC log entries of the same segment of PDESC log space.

As another second example, assume that the IU size=4 KB, that there are only two PDESC log allocation requests 402a-b in the allocation aggregation queue 402 having a total size less than 4 KB, and that the MAX amount of time has elapsed. Put another way, in this latter second example, the MAX amount of time has elapsed waiting for PDESC log allocation requests to accumulate or collect in the queue 402. In this case, the 2 PDESC log allocation requests 402a-b can be combined into a single aggregated allocation request 408 even though the total size of the 2 PDESC log allocation requests is less than the IU size of log device. Generally, processing can be performed to collect or aggregate PDESC log allocation requests for no more than the MAX wait time, before proceeding to allocate PDESC log space/entries for the currently collected or aggregated one or more PDESC log allocation requests. In this example, the single aggregated allocation request can be equal to the total size of the 2 PDESC log entries requested by the combined or aggregated 2 PDESC log allocation requests.

In at least one embodiment, each allocation request 408 for PDESC log space can be an allocation request for a set of contiguous PDESC log entries. If the event or condition triggering the aggregated allocation request 408 is due to the total size of the accumulated PDESC allocation requests being equal to the IU size of the log device, then the request 408 can be a request for a segment of contiguous PDESC log entries having a size equal to the IU size. Alternatively, if the event or condition triggering the aggregated allocation request 408 is due to the MAX amount of time having elapsed rather than the total accumulated size of the collected PDESC log allocation requests being equal to the IU size, then the request 408 can be a request for a segment of contiguous PDESC log entries having the total accumulated size (where the total accumulated size is less than the IU size). Further to the latter example above with the IU size=4 KB, each PDESC log entry having a size of 512 byte, and where the single allocation request is only for 2 PDESC log entries, the corresponding allocated segment has a size=1 KB or 1024 bytes. In at least one embodiment where the size of the segment of contiguous PDESC log entries allocated is equal to the size, or multiple of, an IU, the segment of allocated PDESC log entries can be aligned to start on an IU boundary. In at least one embodiment, if the segment of contiguous PDESC log entries allocated is i) equal to the log device IU size, and ii) not aligned on an IU boundary, then subsequently writing content to the starting address of such an unaligned segment (where the starting LBA or address of the segment written to does not align to an IU boundary and where the size of the content written is equal to the IU size) can trigger the log device to perform two internal RMW operations. Thus, consistent with the foregoing in at least one embodiment, each segment of contiguous PDESC log entries allocated can aligned on an IU boundary.

At a later point in time in processing after phase 1 401a, phase 2 401b can be performed. Put another way, the PDESC log entries or log space allocated in connection with phase 1 401a for first host write I/Os can now be written to or populated with metadata or descriptors corresponding to the first host write I/Os.

Phase 2 401b is generally as discussed above in connection with FIG. 3 where metadata or PDESC log write requests can be queued in the write aggregation queue.

With reference to element 424 of FIG. 4, requests to write metadata or a descriptor for each host write I/O in a corresponding allocated or assigned PDESC log entry can be placed in the write aggregation queue 422. In this example, the allocated or assigned PDESC log entry is previously allocated or assigned for use with a particular host write I/O in phase 1 401a.

For example, assume the PDESC log entry E21 is allocated and assigned to the host write I/O W21 noted above in phase 401a. The PDESC log write request 422a can be placed in the write aggregation queue 422, where the PDESC log write request 422a can be a write request to store a corresponding host write I/O metadata or descriptor in PDESC log entry E21 for W21. Thus generally each element or entry of the write aggregation queue 422 can be a request to write metadata or a descriptor for a corresponding host write I/O to a corresponding PDESC log entry previously allocated or assigned to the host write I/O in phase 1 401a. For example, element 422b can be a second PDESC log allocation request to write corresponding host write I/O metadata for the host write I/O W22 noted above in phase 401a. In phase 401a, PDESC log entry E22 can be allocated and assigned to W22. In this case, the PDESC log write request 422b can be a request to write metadata or a descriptor in PDESC entry E22.

Consistent with other discussion herein, the write aggregation queue 422 can be monitored from both a size and a wait time perspective. Generally, PDESC log write requests such as 422a-b that write metadata to particular PDESC entries of particular segments can be continually added to the queue 422. Processing can be performed to evaluate each segment for which at least one PDESC log write request is in the queue 422 in efforts to collect, accumulate and coalesce write requests writing metadata to PDESC log entries the same segment. For each segment G1, PDESC log write requests to write metadata to corresponding PDESC log entries of segment G1 can be collected in the queue 422 until (as denoted by 426) either i) the total accumulated size of the aggregated PDESC log write requests in 422 for the segment G1 reaches a desired size, such as the SSD IU size, or ii) the maximum allowed wait time (MAX) has elapsed waiting for PDESC log write requests of G1. In at least one embodiment, the wait time for the segment G1 can be measured as the amount of time that elapsed from a starting time when the first or initial PDESC log write request of G1 is placed in the queue 422. When the elapsed or measured wait time reaches MAX, it means that PDESC log requests for G1 have been allowed to collect or accumulate in the queue 422 for the MAX amount of time. For the segment G1, if either i) the total accumulated size of the aggregated PDESC log write requests in 422 for the segment G1 reaches a desired size, such as the SSD IU size, or ii) the maximum allowed wait time (MAX) has elapsed, the set of PDESC log write requests for G1 in the queue 422 can be aggregated (427) into a single aggregated write request (428) that is sent to the PDESC log of the log device.

For example, assume that the IU size=4 KB, that the MAX time has not elapsed, and that there are 8 PDESC log write requests in the write aggregation queue 422. The 8 PDESC log write requests can write corresponding metadata to PDESC log entries of the same segment G1. In this example, the 8 PDESC log write requests have a total size of 4 KB (e.g., each PDESC log write request writes 512 bytes of metadata for a corresponding host write I/O). In this case, the 8 PDESC log write requests can be combined (427) into a single aggregated write request (428) that is sent or written to the PDESC log of the log device. Once the aggregated write request completes and the corresponding host write I/O data (for the corresponding 8 host write I/Os having the 8 PDESC log write requests to G1) is written to the log device, the corresponding 8 host write I/Os can be acknowledged back to the originating respective one or more hosts. It should be noted that in this example, each of the 8 host write I/Os can be individually acknowledged once each such host I/O's write data and metadata or descriptor have been stored, respectively, in the PB log and PDESC log of the log device.

As another example, assume that the IU size (e.g., the size of the segment G1)=4 KB, that 8 consecutive contiguous PDESC log entries are in the segment G1, and that there are only two PDESC log write requests 422a-b that write metadata to 2 corresponding PDESC log entries of the segment G1. In this latter example, assume the total size of metadata to be written by 422a-b to corresponding PDESC log entries of G1 is less than 4 KB, and that the MAX amount of time has elapsed while waiting for or collecting PDESC write requests of G1. As noted above, the amount of elapsed wait time can be measured from a start time corresponding to the point in time when a first or initial PDESC log write request of G1 is placed in the queue 422. Put another way, in this latter second example, the MAX amount of time has elapsed waiting for PDESC log write requests of G1 to accumulate or collect in the queue 422. In this case, the 2 PDESC log write requests 422a-b can be combined into a single aggregated write request AGG1 that is sent or written to the PDESC log of the log device even though the total size of the 2 PDESC log write requests is less than the IU size of log device. Once the aggregated write request completes and the corresponding host write I/O data (for the corresponding 2 host write I/Os having the 2 PDESC log write requests 422a-b) is written to the PB log of the log device, the corresponding 2 host write I/Os can be acknowledged back to the originating respective one or more hosts. It should be noted that in this example, each of the 2 host write I/Os can be individually acknowledged once each such host I/O's write data and metadata or descriptor have been stored, respectively, in the PB log and PDESC log of the log device.

At a later point time after issuing the above-noted aggregated write request AGG1 writing metadata to 2 PDESC log entries of segment G1, assume that 6 additional PDESC log write requests are then added to the queue 422, where the 6 additional PDESC log write requests write metadata to the remaining 6 PDESC log entries of the segment G1. Also assume that the 6 PDESC log write requests collect or accumulate in the queue 422 within the MAX amount of time. In this case, the additional 6 PDESC log write requests can be combined into a second single aggregated write request AGG2 that is sent or written to the PDESC log of the log device.

In at least one embodiment, processing such as described above and in connection with FIGS. 3-4 can be performed in connection with write I/O requests of a system with a single processing node. The techniques of the present disclosure can further extend the foregoing for use in connection with a dual node storage system, or more generally a multi-node storage system, where a single sequential PDESC log 320 can be shared and used by the multiple nodes.

In at least one embodiment when a single sequential log, such as the PDESC log, is used by multiple nodes, each node can write independently to the log. As such, the log space allocations can be coordinated in a manner that is conducive to each node's ability to perform coalescing. That is, on dual-node systems, intermixing log space allocations from both nodes can limit the ability to aggregate the log writes as each node cannot aggregate writes to the log space allocated to the other node.

Accordingly in at least one embodiment, the techniques of the present disclosure provide a private per-node allocation aggregation queue so that each node can use its own allocation aggregation queue to aggregate the allocation of PDESC log entries of the node. In this manner, processing can group sets of allocations for each node separately resulting in sequentially allocated PDESC log space or entries for the allocation requests comprising each set. Consistent with discussion herein, such as in connection with FIG. 4, collecting PDESC log allocation requests in each node's allocation aggregation queue has a maximum size and MAX wait time for each allocation segment. Consider, for example with reference to FIG. 2A, a storage system with two nodes, node A and node B. In at least one such embodiment, node A can have its own allocation aggregation queue, and node B can have its own allocation aggregation queue. Additionally in at least one embodiment, each node can have its own write aggregation queue for use in connection with writing metadata to PDESC log entries previously allocated in connection with PDESC log allocation requests from the node's allocation aggregation queue or alternatively the peer node's allocation aggregation queue. Thus in at least one embodiment with a dual node system, each node can have its own set of queues 402, 422 such as illustrated in FIG. 4 in connection with phase 1 401a and phase 2 401b, such that there a total of 2 allocation aggregation queues (one per node) and 2 write aggregation queues (one per node).

A particular node that receives a host write I/O operation can be referred to as the initiator. Thus in a dual node system where both nodes A and B can receive host write I/Os, node A can be an initiator with respect to host write I/Os received by node A, and node B can be an initiator with respect to host write I/Os received by node B. In at least one embodiment, for an initiator node that receives a host write I/O W31, a corresponding PDESC log allocation request R31a can be included in the initiator node's allocation aggregation queue and processed as described above, such as in connection with FIG. 4, thereby resulting in assignment or allocation of a PDESC log entry E31 for the host write I/O W31 received by the initiator node. In at least one embodiment, the protocol or workflow used in processing the host write I/O W31 received by the initiator can include the remaining peer node (that did not receive the host write I/O) writing the corresponding metadata to the PDESC log entry E31 previously allocated as a result of a PDESC log allocation request R31a of the initiator node's allocation aggregation queue. For example, node A can be an initiator that receives the host write I/O W31 resulting in placing a PDESC log allocation request R31a on node A's allocation aggregation queue so that a corresponding PDESC log entry E31 is assigned or allocated for storing metadata of W31. At a later point in time, the metadata for W31 can be determined resulting in placing a corresponding PDESC log write request R31b on node B's write aggregation queue. R31b can be included in node B's write aggregation queue and processed as described above, such as in connection with FIG. 4. Thus in at least one embodiment, an initiator node can allocate and assign PDESC log entries of a segment to corresponding host write I/Os received by the initiator node. Subsequently, the non-initiator peer node can then write metadata portions to the segments of PDESC log entries previously allocated and assigned to corresponding host write I/Os by the initiator node. With such a dual node system in at least one embodiment, node A can allocate segments of PDESC log entries assigned to corresponding host write I/O received by node A, where node B subsequently writes metadata to the segments of PDESC log entries allocated previously by node A for host write I/Os received by node A. Additionally with such a dual node system, node B can allocate segments of PDESC log entries assigned to corresponding host write I/O received by node B, where node A subsequently writes metadata to the segments of PDESC log entries allocated previously by node B for host write I/Os received by node B.

In at least one embodiment, one of the nodes, such as node A, can be the primary node that manages and handles allocations from the shared PDESC log. Thus, for example, if node B wants to allocate space or entries from the PDESC log, node B can issue a corresponding allocation request to node A whereby node A makes the allocation that is then associated with node B. In at least one embodiment, the primary node, such as node A, that handles the PDESC log allocations can also manage both node A's allocation aggregation queue and also node B's allocation aggregation queue, where each node A and B can then manage their own write aggregation queue. Alternatively in at least one embodiment, each of the nodes A and B can manage their own respective allocation aggregation queue as well as their own respective write aggregation queue.

In at least one embodiment of a dual node system as noted above, the protocol or workflow used in processing a host write I/O received by a first initiator node can include the initiator node allocating or assigning the respective PDESC log entry with the corresponding metadata being written to the respective PDESC log entry by the remaining peer node rather than the first initiator node. In this case in at least one embodiment, since the peer node (that did not receive the host write I/O) is writing the host write I/O's metadata to the PDESC log, i) a corresponding PDESC allocation request for a PDESC log entry E1 can be included and aggregated in the initiator node's allocation aggregation queue to thereby result in allocation of a segment G1 including E1, and ii) a corresponding PDESC log write request that writes corresponding metadata to E1 can be included in the peer node's write aggregation queue, where PDESC log write requests to the segment G1 can collect or accumulate to thereby result in the peer node issuing an single aggregated write request to write metadata to the segment G1.

Alternatively, in an embodiment, the protocol or workflow for processing the host write I/O can include the first initiator node (that received the host write I/O) writing the host write I/O's metadata to the PDESC log. In this case in at least one embodiment where the initiator node (that received the host write I/O) writes the corresponding metadata to the PDESC log, i) a corresponding PDESC allocation request for a PDESC log entry E2 can be included in the initiator node's allocation aggregation queue, and ii) a corresponding PDESC log write request that writes corresponding metadata to E2 can be included in the initiator node's write aggregation queue. In this latter alternative embodiment, each node can both allocate and write metadata to PDESC entries for corresponding host write I/Os received by the node.

In any case in at least one embodiment, a segment or aggregate of consecutive contiguous PDESC log entries for corresponding first host write I/Os can be allocated as a result of aggregating and coalescing PDESC log allocation requests placed on a node's allocation aggregation queue. In at least one embodiment, the size of the allocated segment can be the total size of the aggregated PDESC log allocation requests. If the total size of the aggregated PDESC log allocation requests is equal to the IU size of the log device, then the size of the segment is the IU size. Subsequently, PDESC write allocation requests that write to corresponding PDESC log entries of the segment can be included in a node's write aggregation queue, where such PDESC write allocation requests can also be coalesced and aggregated to perform an aggregated write of the metadata written to PDESC log entries of the segment. Generally in at least one embodiment, the foregoing allocation aggregation queue and write aggregation queue can be associated with the same node or two different nodes depending on, for example, the particular workflow or protocol implemented in an embodiment.

As noted above in at least one embodiment with multiple nodes, each node can have its own allocation aggregation queue. As a result, the techniques of the present disclosure can provide for coordination between the PDESC log space allocations being maintained for each node. In at least one embodiment, allocations for segments of PDESC log entries by the multiple nodes can be serialized to achieve sequential allocation of desired segments such as described below in connection with FIG. 5.

Figure 5:
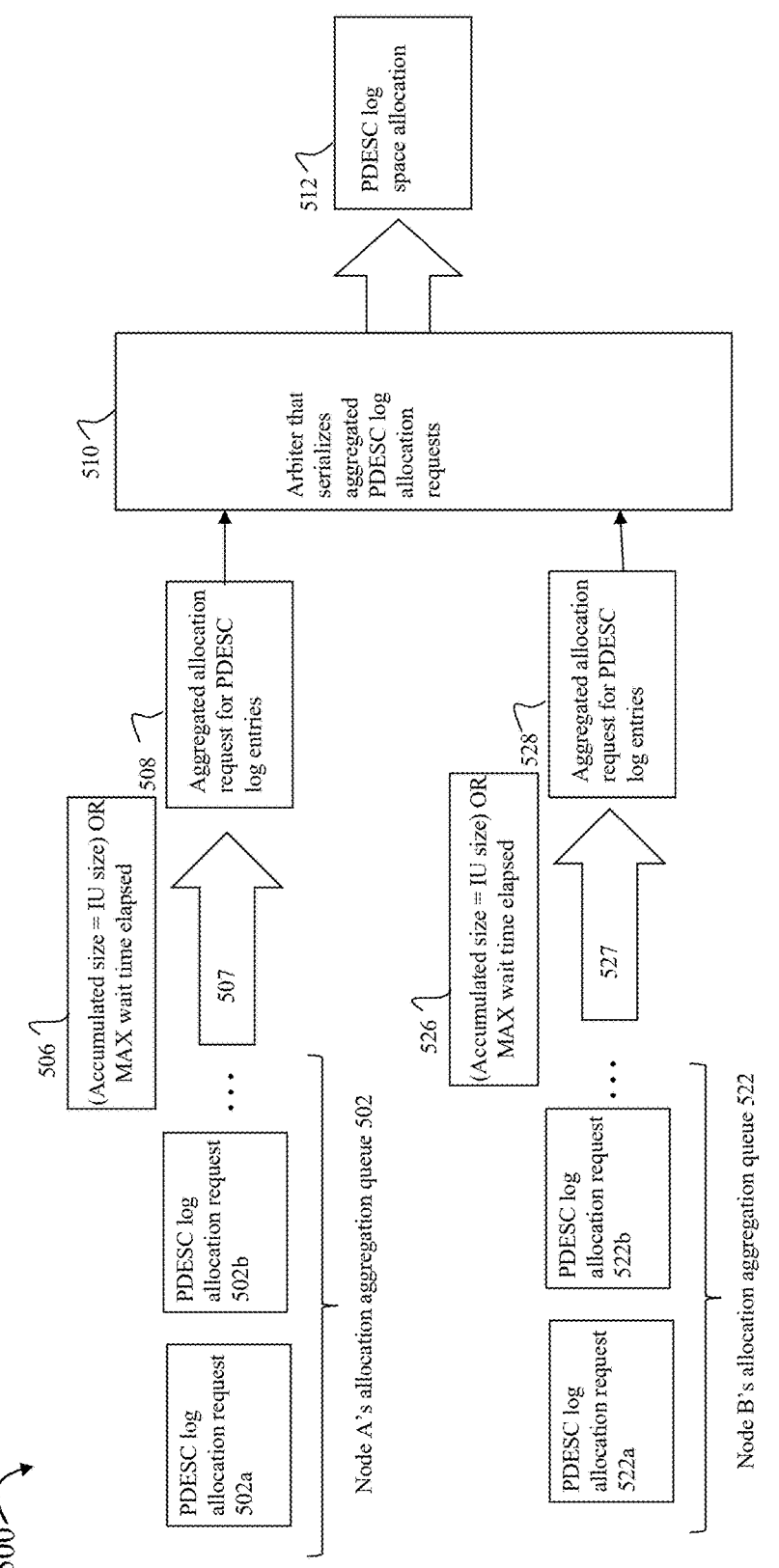

Referring to FIG. 5, shown is an example 500 illustrating components in at least one embodiment of a dual node storage system in accordance with the techniques of the present disclosure. The example 500 illustrates components and associated processing that can be performed in connection with PDESC log space allocation. In particular, the components of the example 500 can be used in connection with allocating segments of PDESC log entries based on aggregated PDESC log allocation requests as in phase or stage 1 of a dual node system.

Element 502 can denote node A's allocation aggregation queue of PDESC log allocation requests such as 502a-b. Consistent with other discussion herein such as in connection with FIG. 4, PDESC log allocation requests for corresponding host write I/Os can be collected or accumulated in node A's allocation aggregation queue 502 until either of the following two conditions denoted by 506 occurs: i) the collected or aggregated PDESC log allocation requests of 502 have a total aggregated or accumulated size equal to the IU size of the log device, or ii) the MAX wait time has elapsed. In response to the occurrence of either of the foregoing conditions occurring, an aggregated allocation request 508 can be sent (507) to allocate a segment of PDESC log entries, where the segment has a size and number of corresponding PDESC log entries based on the number of collected or aggregated PDESC log allocation requests from 502. Each aggregated PDESC allocation request 508 for a segment from node A, or more generally, based on collected or aggregated PDESC log allocation requests from node A's queue 502 can be sent to an arbiter 510. The arbiter 510 can perform processing to serialize PDESC log allocation requests for segments of PDESC log entries from the multiple nodes, such as nodes A and B. The arbiter 510 and related processing that can be performed in at least one embodiment is discussed in more detail below.

Element 522 can denote node B's allocation aggregation queue of PDESC log allocation requests such as 522a-b. Consistent with other discussion herein such as in connection with FIG. 4, PDESC log allocation requests for corresponding host write I/Os can be collected or accumulated in node B's allocation aggregation queue 522 until either of the following two conditions denoted by 526 occurs: i) the collected or aggregated PDESC log allocation requests of 522 have a total aggregated or accumulated size equal to the IU size of the log device, or ii) the MAX wait time has elapsed. In response to the occurrence of either of the foregoing conditions occurring, an aggregated allocation request 528 can be sent (527) to allocate a segment of PDESC log entries, where the segment has a size and number of corresponding PDESC log entries based on the number of collected or aggregated PDESC log allocation requests from 522. Each aggregated PDESC allocation request 528 for a segment from node B, or more generally, based on collected or aggregated PDESC log allocation requests from node B's queue 522 can be sent to the arbiter 510.

In at least one embodiment, the arbiter 510 can perform processing to serialize aggregated PDESC log allocation requests for segments of PDESC log entries from the nodes A and B based on one or more criteria or rules such as those discussed below. Aggregated PDESC log allocation requests for segments of PDESC log entries from the nodes A and B can proceed to PDESC log space allocation 512 based on the serialized or sequential order determined by the arbiter 510. Generally, the criteria or rules used by the arbiter 512 to serialize and service the aggregated PDESC log allocation requests from the nodes A and B can include any suitable criteria or rules that provide a deterministic and fair ordering of such aggregated requests from the multiple nodes. The criteria or rules can be used in connection with i) determining an ordering in which aggregated requests from the same node are serviced, and ii) determining an ordering in which aggregated requests from different nodes are serviced.

In at least one embodiment with a dual node system, when proceeding to allocate a segment H1 for a first node, the arbiter 510 can use a first rule or criterion that specifies to check to see if allocations are actively being done or in-progress for the other peer node (as opposed to being collected into a segment), and if so, processing cannot proceed to allocate segment H1 until the current in-progress allocations for the other node are complete. For example, assume that the arbiter 510 receives a request R11 from node A to allocate segment H1 based on aggregated requests from node A's allocation aggregation queue 502. However, processing can be in-progress or currently ongoing for allocating segment B1 based on another request R12 previously received from node B (e.g., based on aggregated requests from node B's allocation aggregation queue 522). In this case the arbiter 510 can determine that R11 can be serviced, to thereby allocation segment H1, following completion of the in-progress allocation of segment B1 based on request R12.

In at least one embodiment, when proceeding to allocate the segment H1 for the first node, the arbiter 510 can use a second rule or criterion: if allocations for the other peer node are currently waiting or pending, allocation of segment H1 cannot proceed until the waiting or pending allocation requests from the peer node have completed. For example, assume the arbiter 510 receives the request R11 from node A to allocate segment H1 as noted above. In this scenario, assume when the arbiter 510 receives R11 that i) there is currently the in-progress request R12 from node B and also ii) another waiting or pending request R13 from node B to allocate segment B2. Thus the arbiter 510 has received R12 and R13 from node B prior to receiving R11 from node A. In this case, the arbiter 510 may determine that aggregated allocation requests R12, R13 and R11 can proceed sequentially based on the following: i) in-progress request R12 allocation from node B can complete to allocate segment B1, ii) following completion of R12, waiting request R13 from node B can be serviced to allocate segment B2, and then iii) following completion of R13, request R11 from node A can be serviced to allocate segment H1. Thus in at least one embodiment, the arbiter 510 can serialize aggregate PDESC log allocation requests from different nodes based in a FIFO or first in first out order.

In at least one embodiment, the arbiter 510 can use a second rule or criterion: pending or waiting segment allocation requests from the same node can be ordered or prioritized to proceed with their segment allocations based on which pending or waiting segment allocation request for allocating a respective segment has the earliest corresponding time when a PDESC log allocation request was enqueued for the respective segment in an allocation aggregation queue. In at least one embodiment, the order in which PDESC log allocation requests are placed in a node's queue (502, 522) can denote a relative time order in which corresponding host write I/Os are received by the storage system. To illustrate, assume node B has aggregated request R41 to allocate segment B41, and aggregated request R42 to allocate segment B42. R41 and R42 can be sent from node B to the arbiter 510. R41 can be an aggregated request to allocate PDESC log entries based on first corresponding PDESC log allocation requests from node B's allocation aggregation queue 522 for first host write I/Os. Each of the first PDESC log allocation requests can have an associated time or timestamp denoting the time when the PDESC log allocation request is placed in node B's allocation aggregation queue 522. In at least one embodiment, the foregoing time or timestamp can denote the time when a corresponding host write I/O received is placed in queue 522. The segment B41 can have a corresponding time or timestamp TS1 denoting the earliest such time or timestamp of all the first PDESC log allocation requests associated with aggregated request R41 and segment B41. Similarly R42 can be an aggregated request to allocate PDESC log entries based on second corresponding PDESC log allocation requests from node B's allocation aggregation queue 522 for second host write I/Os. Each of the second PDESC log allocation requests can have an associated time or timestamp denoting the time when the PDESC log allocation request is placed in node B's allocation aggregation queue 522. The segment B42 can have a corresponding time or timestamp TS2 denoting the earliest such time or timestamp of all the second PDESC log allocation requests associated with request R42 and segment B42. In at least one embodiment, the arbiter 510 can determine an ordering for proceeding with allocation of pending or waiting requests R41 (requesting allocation of B41) and R42 (requesting allocation of B42) based on TS1 and TS2. In this example, assuming that TS1 denotes an earlier point in time than TS2, then the arbiter 510 proceeds request R41 that allocates segment B41 before proceeding with request R42 that allocates segment B42.

Figure 6:
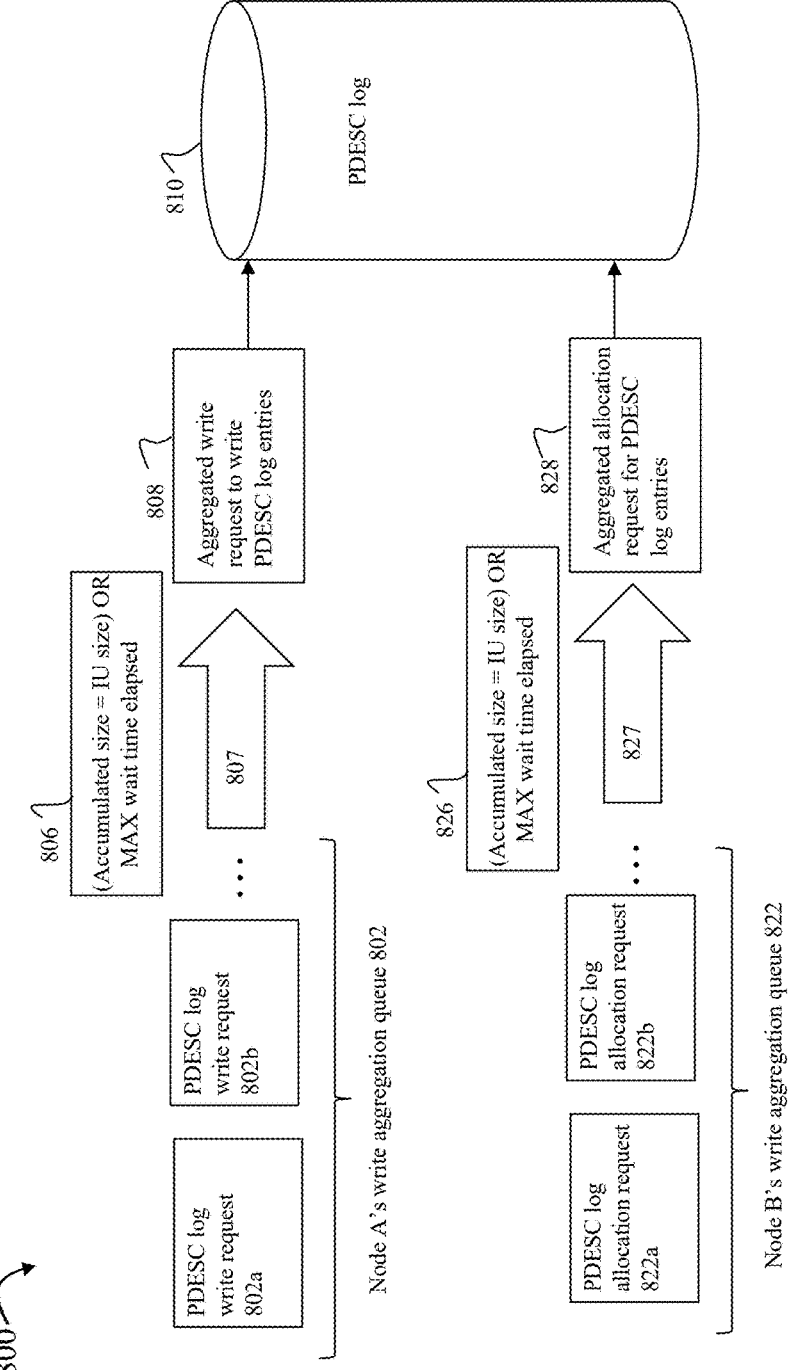

Referring to FIG. 6, shown is an example 800 illustrating components in at least one embodiment of a dual node storage system in accordance with the techniques of the present disclosure. The example 800 illustrates components and associated processing that can be performed in connection with phase or stage 2 of a dual node system.

Element 802 can denote node A's write aggregation queue of PDESC log write requests such as 802*a-b*. Consistent with other discussion herein such as in connection with FIG. 4, PDESC log write requests for writing metadata portions of corresponding host write I/Os to corresponding allocated segments can be collected or accumulated in node A's write aggregation queue 802. Consistent with other discussion herein such as in connection with FIGS. 3 and 4, each of the previously allocated segments can be independently evaluated based on corresponding PDESC log write requests of a respective segment until either of the following two conditions denoted by 806 occurs with respect to the segment: i) the collected or aggregated PDESC log write requests of 802 for the segment have a total aggregated or accumulated size equal to the IU size of the log device, or ii) the MAX wait time has elapsed waiting or collecting PDESC log write requests for the segment. In response to the occurrence of either of the foregoing conditions occurring for a single segment, an aggregated allocation request 808 can be sent (807) to write metadata for the collected or aggregated one or more PDESC log write requests directed to the single segment to the PDESC log 810.

Element 822 can denote node B's write aggregation queue of PDESC log write requests such as 822*a-b*. Consistent with other discussion herein such as in connection with FIG. 4, PDESC log write requests for writing metadata portions of corresponding host write I/Os to corresponding allocated segments can be collected or accumulated in node B's write aggregation queue 822. Consistent with other discussion herein such as in connection with FIGS. 3 and 4, each of the previously allocated segments can be independently evaluated based on corresponding PDESC log write requests of a respective segment until either of the following two conditions denoted by 826 occurs with respect to the segment: i) the collected or aggregated PDESC log write requests of 822 for the segment have a total aggregated or accumulated size equal to the IU size of the log device, or ii) the MAX wait time has elapsed waiting or collecting PDESC log write requests for the segment. In response to the occurrence of either of the foregoing conditions occurring for a single segment, an aggregated allocation request 828 can be sent (827) to write metadata for the collected or aggregated one or more PDESC log write requests directed to the single segment to the PDESC log 810.

Figure 7:
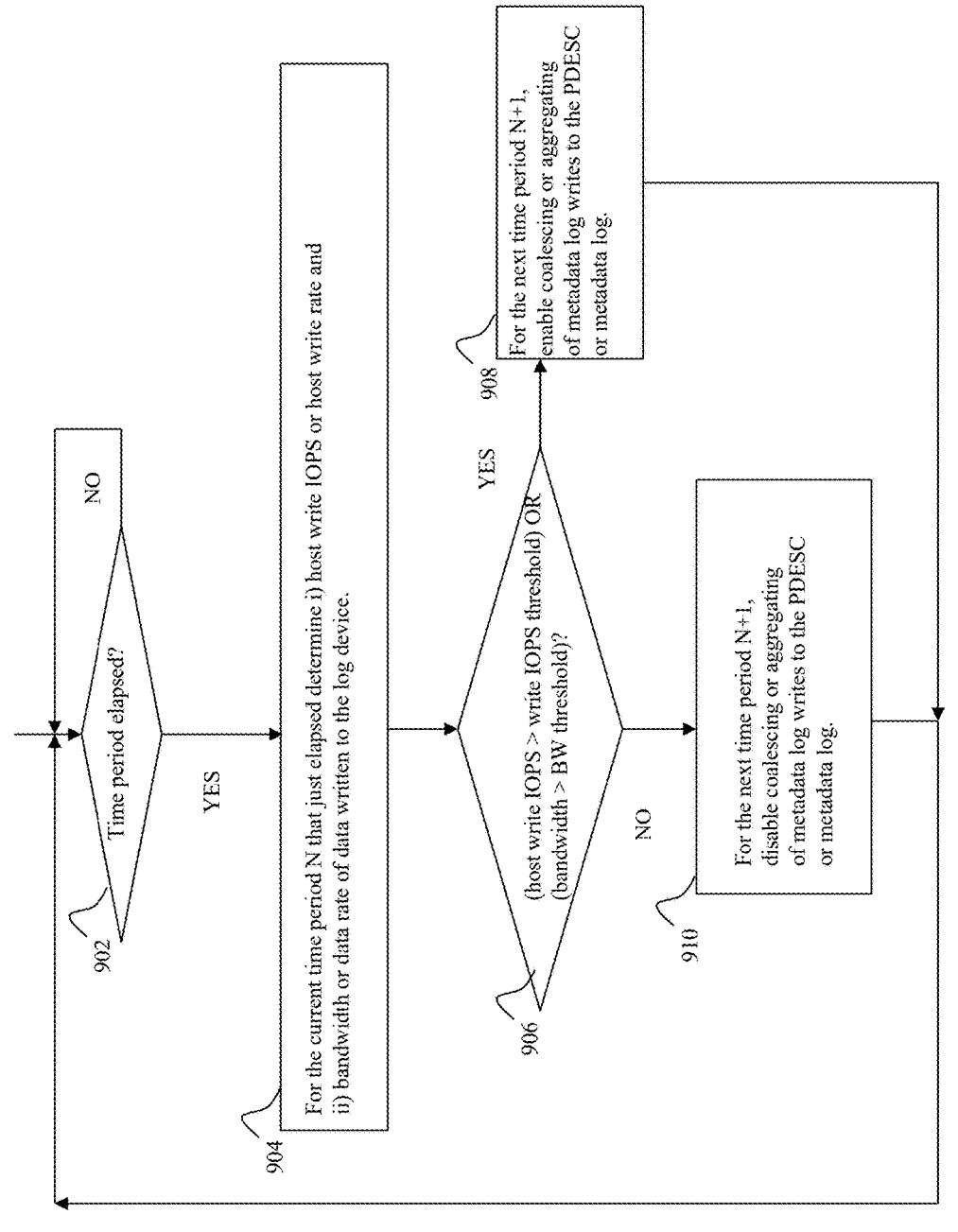
FIG. 7 is a flowchart of processing steps that can be performed in at least one embodiment in accordance with the techniques of the present disclosure.

Referring to FIG. 7, shown is a flowchart 900 of processing that can be performed in at least one embodiment in accordance with the techniques of the present disclosure. The steps of 900 summarize processing described above in connection with adaptively and periodically determining whether or not to perform coalescing and thus aggregation of PDESC log write requests that write metadata to PDESC log entries of the PDESC log stored on the log device.

At the step 902, processing can determine whether another time period has elapsed. Control remains at the step 902 until the step 902 evaluates to yes. If the step 902 evaluates yes, control proceeds to the step 904. At the step 904, For the current time period N that just elapsed determine i) a host write IOPS or host write rate and ii) a bandwidth or data rate of data written to the log device. From the step 904 control proceeds to the step 906.

At the step 906, processing can determine whether i) the host write IOPS exceeds the write IOPS threshold, or ii) the bandwidth exceeds a bandwidth threshold). If the step 906 evaluates to yes or true, where at least one of the foregoing thresholds is exceeded, control proceeds to the step 908.

At the step 908, for the next time period N+1, enable coalescing or aggregating of metadata log writes to the PDESC or metadata log. From the step 908, control returns to the step 902 to wait for the next time period to elapse.

If the step 906 evaluates to no or false, control proceeds to the step 910. At the step 910, for the next time period N+1, disable coalescing or aggregating of metadata log writes to the PDESC or metadata log.

The techniques of the present disclosure can be used in various embodiments to minimize the number of log device writes which are less than the IU size of the log device in efforts to maximize host write I/O performance when presented with a heavy host I/O workload, such as a heavy write host I/O workload, to thereby allow storage systems to provide NVRAM-like behavior using an SSD as the log device.

In at least one embodiment, the techniques of the present disclosure can be used to maximize peak IOPS and bandwidth performance when host a requires such performance by coalescing small log writes that are less than the IU size fo the log device.

In at least one embodiment, the techniques of the present disclosure can be optimized for latency when host or storage client I/O workload does not require peak IOPS and bandwidth capabilities of the log device by disengaging coalescing of small writes to the log device. In at least one embodiment, processing can include monitoring host I/O workload and intelligently engaging and disengaging coalescing of log writes to optimize for peak IOPS and bandwidth or latency.

In at least one embodiment, the techniques of the present disclosure can provide an added benefit in that when there is a high heavy host I/O workload generating high IOPS and bandwidth loads thereby increasing the wear on the SSD used as the log device, coalescing small (e.g., less than the log device IU size) writes removes or reduces SSD internal RMW operations thus reducing the wear on the SSD used as the log device.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving first host write input/output (I/O) requests; and
performing first processing that persistently records the first host write I/O requests on a log device, wherein the log device includes a metadata log for storing metadata portions for the first host write I/O requests, wherein the first processing includes:
aggregating, in a first write aggregation queue, first log write requests that write first metadata portions for the first host write I/O requests in a first segment of first metadata log entries of the metadata log of the log device; and
responsive to determining that i) the first log write requests corresponding to the first segment write a first amount of metadata equal to a maximum size, or ii) a maximum amount of time has elapsed during said aggregating, sending a first aggregated write request to the metadata log of the log device, wherein the first aggregated write request writes the first metadata portions to the first segment of first metadata log entries;
wherein said first processing is performed during a time period N when aggregation of log of log write requests that write metadata portions for corresponding host write I/O requests to the metadata log of the log device is enabled thereby resulting in said aggregating and said sending the first aggregated write request.

2. The computer-implemented method of claim 1, wherein the maximum size denotes a multiple of an indirection unit (IU) size of the log device, where the IU size denotes the internal block size of the log device.

3. The computer-implemented method of claim 2, wherein each write to the log device, that writes an amount of content having a corresponding size that is less than the IU size, results in the log device internally performing a read modify write (RMW) operation to write the content.

4. The computer-implemented method of claim 3, wherein each of the first log write requests writes one of the first metadata portions, and wherein each of the first metadata portions has a corresponding size that is less than the IU size.

5. The computer-implemented method of claim 4, wherein the first log writes corresponding to the first segment collectively write the first amount of metadata equal to the IU size of the log device.

6. The computer-implemented method of claim 4, wherein each of the first metadata portions is associated with a corresponding one of the first host write I/O requests that writes first content to a first target location, and wherein said each metadata portion includes first information describing the first target location.

7. The computer-implemented method of claim 1, wherein a first host write I/O operation is included in the first host write I/O requests, wherein the first host write I/O operation is from a first host and writes first content to a first target location, and wherein the processing includes:
persistently recording the first content on the log device; and
wherein the method includes:
responsive to persistently recording the first content and completing the first aggregated write request that writes the first metadata portions to the first segment of first metadata log entries, returning an acknowledgement to the first host regarding completion of the first host write I/O operation.

8. The computer-implemented method of claim 1, further comprising:
determining, for the time period N, a host write I/O rate and a bandwidth regarding data written to the log device; and
responsive to determining, for the time period N, that i) the host write I/O rate exceeds a first threshold or ii) the bandwidth exceeds a second threshold, enabling, for a next time period N+1, aggregation of log write requests that write metadata portions for corresponding host write I/O requests to the metadata log of the log device.

9. The computer-implemented method of claim 8, further comprising:
responsive to determining, for the time period N, that i) the host write I/O rate does not exceed the first threshold and ii) the bandwidth does not exceed the second threshold, disabling, for the next time period N+1, aggregation of log write requests that write metadata portions for corresponding host write I/O requests to the metadata log of the log device.

10. The computer-implemented method of claim 1, wherein the first processing includes:
aggregating, in a first allocation aggregation queue, first log allocation requests each requesting allocation of a metadata log entry from the metadata log of the log device for storing one of the first metadata portions for a corresponding one of the first host write I/O requests; and
responsive to determining that i) the first log allocation requests write the first amount of metadata equal to the maximum size, or ii) the maximum amount of time has elapsed during said aggregating of the first log allocation requests, sending a first aggregated allocation request to the metadata log of the log device, wherein the first aggregated log request requests allocation of the first segment of the first metadata log entries from the metadata log stored on the log device.

11. The computer-implemented method of claim 10, wherein the first metadata log entries of the first segment are contiguous consecutive metadata log entries of the metadata log.

12. The computer-implemented method of claim 11, wherein the method is performed in a system with a plurality of processing nodes, and wherein each of the plurality of processing nodes is associated with i) a corresponding one of a plurality of write aggregation queues used to aggregate log write requests for metadata portions written to segments by said each processing node, and ii) a corresponding one of a plurality of allocation aggregation queues used to aggregate log allocation requests for metadata log entries requested by said each processing node.

13. The computer-implemented method of claim 12, wherein the plurality of write aggregation queues includes the first write aggregation queue, and wherein the plurality of allocation aggregation queues includes the first allocation aggregation queue.

14. The computer-implemented method of claim 13, wherein the plurality of processing nodes includes a first processing node, and wherein the first write aggregation queue is associated with the first processing node whereby the first write aggregation queue aggregates log write requests for data portions written to segments by the first processing node, and wherein the first allocation aggregation queue is associated with the first processing node whereby the first allocation aggregation queue aggregates log allocation requests for metadata log entries requested by the first processing node.

15. The computer-implemented method of claim 13, wherein the plurality of processing nodes includes a first processing node and a second processing node, and wherein the first write aggregation queue is associated with the first processing node whereby the first write aggregation queue aggregates log write requests for data portions written to segments by the first processing node, and wherein the first allocation aggregation queue is associated with the second processing node whereby the first allocation aggregation queue aggregates log allocation requests for metadata log entries requested by the second processing node.

16. The computer-implemented method of claim 13, further comprising:

receiving, by an arbiter, a plurality of aggregated allocation requests requesting allocation of segments of metadata log entries from the metadata log stored on the log device, wherein the plurality of aggregated allocation requests includes the first aggregated allocation request requesting allocation of the first segment of metadata log entries, wherein the first segment has a first size, and wherein the plurality of aggregated allocation requests includes a second aggregated allocation request requesting allocation of a second segment of metadata log entries, wherein the second segment has a second size, wherein the first size is larger than the second size thereby denoting that the first segment has a greater number of metadata log entries than the second segment.

17. The computer-implemented method of claim 16, wherein the first aggregated allocation request and the second aggregated allocation request are from the first processing node, and wherein the first aggregated allocation request has a corresponding first time stamp denoting an earliest time at which a log allocation request, that is aggregated into the first aggregated allocation request, was enqueued in the first allocation aggregation queue, and wherein the second aggregated allocation request has a corresponding second time stamp denoting an earliest time at which a log allocation request, that is aggregated into the second aggregated allocation request, was enqueued in the first allocation aggregation queue, wherein the first time stamp denotes an earlier point in time prior to the second time stamp, and wherein the method includes:

the arbiter determining, based on the first time stamp and the second time stamp, to service the first aggregated allocation request prior to the second aggregated allocation request thereby resulting in allocation of the first segment prior to the second segment.

18. A system comprising:

one or more processors; and one or more memories comprising code stored thereon that, when executed, performs a method comprising:

receiving first host write input/output (I/O) requests; and performing first processing that persistently records the first host write I/O requests on a log device, wherein the log device includes a metadata log for storing metadata portions for the first host write I/O requests, wherein the first processing includes:

aggregating, in a first write aggregation queue, first log write requests that write first metadata portions for the first host write I/O requests in a first segment of first metadata log entries of the metadata log of the log device; and responsive to determining that i) the first log write requests corresponding to the first segment write a first amount of metadata equal to a maximum size, or ii) a maximum amount of time has elapsed during said aggregating, sending a first aggregated write request to the metadata log of the log device, wherein the first aggregated write request writes the first metadata portions to the first segment of first metadata log entries;

wherein said first processing is performed during a time period N when aggregation of log of log write requests that write metadata portions for corresponding host write I/O requests to the metadata log of the log device is enabled thereby resulting in said aggregating and said sending the first aggregated write request.

19. One or more non-transitory computer-readable media comprising code stored thereon that, when executed, performs a method comprising:

receiving first host write input/output (I/O) requests; and performing first processing that persistently records the first host write I/O requests on a log device, wherein the log device includes a metadata log for storing metadata portions for the first host write I/O requests, wherein the first processing includes:

aggregating, in a first write aggregation queue, first log write requests that write first metadata portions for the first host write I/O requests in a first segment of first metadata log entries of the metadata log of the log device; and responsive to determining that i) the first log write requests corresponding to the first segment write a first amount of metadata equal to a maximum size, or ii) a maximum amount of time has elapsed during said aggregating, sending a first aggregated write request to the metadata log of the log device, wherein the first aggregated write request writes the first metadata portions to the first segment of first metadata log entries;

wherein the first processing includes:

aggregating, in a first allocation aggregation queue, first log allocation requests each requesting allocation of a metadata log entry from the metadata log of the log device for storing one of the first metadata portions for a corresponding one of the first host write I/O requests; and responsive to determining that i) the first log allocation requests write the first amount of metadata equal to the maximum size, or ii) the maximum amount of time has elapsed during said aggregating of the first log allocation requests, sending a first aggregated allocation request to the metadata log of the log device, wherein the first aggregated log request requests allocation of the first segment of the first metadata log entries from the metadata log stored on the log device.

20. The computer implemented method of claim 19, wherein the log device used in the first processing is a solid state storage device (SSD), and wherein the SSD has an indirection unit (IU) size defining an internal block size of the log device.

* * * * *